US009223991B2

(12) United States Patent
Mevec et al.

(10) Patent No.: US 9,223,991 B2
(45) Date of Patent: *Dec. 29, 2015

(54) SYSTEMS, METHODS, AND COMPUTER MEDIUM TO SECURELY TRANSFER LARGE VOLUMES OF DATA BETWEEN PHYSICALLY ISOLATED NETWORKS HAVING DIFFERENT LEVELS OF NETWORK PROTECTION

(71) Applicant: Saudi Arabian Oil Company, Dhahran (SA)

(72) Inventors: Paul Francis Mevec, Dhahran (SA); Ibrahim A. Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 7 days.

This patent is subject to a terminal disclaimer.

(21) Appl. No.: 14/336,423

(22) Filed: Jul. 21, 2014

(65) Prior Publication Data

US 2015/0261962 A1 Sep. 17, 2015

Related U.S. Application Data

(60) Provisional application No. 61/954,237, filed on Mar. 17, 2014.

(51) Int. Cl.
| G06F 12/14 | (2006.01) |
| G06F 21/60 | (2013.01) |
| H04L 29/08 | (2006.01) |
| G06F 17/30 | (2006.01) |

(52) U.S. Cl.
CPC ............. *G06F 21/60* (2013.01); *H04L 67/10* (2013.01)

(58) Field of Classification Search
CPC ............ G06F 3/021; G06F 17/3075; G06F 17/30575; H04L 12/2461; H04L 41/28
See application file for complete search history.

(56) References Cited

U.S. PATENT DOCUMENTS

| 7,328,848 B2 | 2/2008 | Xia et al. |
| 7,478,755 B2 | 1/2009 | Sekiguchi |

(Continued)

FOREIGN PATENT DOCUMENTS

| WO | 2008093314 | 8/2008 |
| WO | 2009047556 | 4/2009 |
| WO | 2013101358 | 7/2013 |

OTHER PUBLICATIONS

"DataDiode" Fox-IT, retrieved at https://www.fox-it.com/en/products/datadiode, Jan. 10, 2014, 3 pages.

(Continued)

*Primary Examiner* — Venkat Perungavoor
(74) *Attorney, Agent, or Firm* — Bracewell & Giuliani LLP; Constance G. Rhebergen; Brian H. Tompkins

(57) ABSTRACT

Embodiments of computer-implemented methods, systems, and non-transitory computer-readable medium having one or more computer programs stored therein are provided to transfer contents of transactional database records associated with a data historian between two or more networks configured to have different levels of network protection. Generated data barcodes can be decoded to produce contents of transactional database records to be transmitted between two or more networks having different levels of network security protection. Decoded contents of the transactional database records can then be securely communicated back to the sender for comparison by generating validation barcodes to be decoded by the sender. Generated verification barcodes can then be decoded to produce verification data. Verification data can confirm success of the transmission of contents of transactional database records encoded in the data barcodes. Decoded contents of transactional database records can then be stored responsive to an indication of successful transmission.

21 Claims, 17 Drawing Sheets

(56) References Cited

U.S. PATENT DOCUMENTS

| | | |
|---|---|---|
| 2002/0112181 A1 | 8/2002 | Smith |
| 2007/0182983 A1 | 8/2007 | Wyatt et al. |
| 2011/0210171 A1 | 9/2011 | Brown |
| 2013/0019096 A1 | 1/2013 | Palzer et al. |
| 2013/0086465 A1 | 4/2013 | Boudville |
| 2013/0137510 A1 | 5/2013 | Weber |
| 2013/0152206 A1 | 6/2013 | Staubly |

OTHER PUBLICATIONS

"DualDiode Technology & Owl System Functionality" Owl Computing Technologies, Inc., retrieved at http://www.owlcti.com/dualdiode_technology.html, 1999, 1 page.

"QR Code Essentials" DENSO, 2011, pp. 1-12.

Jones et al. "Secure Data Export and Auditing using Data Diodes" University of Iowa, Department of Computer Science, Iowa City, Iowa, 5 pages.

Poulin, Chris "Data Diodes: Super Security or Super Pain?" retrieved at http://www.securityweek.com/data-diodes-super-security-or-super-pain, Jan. 10, 2012, 8 pages.

Scarbrough et al. "Tennessee Valley Authority's (TVA) Data Diode Program" ICSJWG Spring Conference, May 8-9, 2012, 20 pages.

Sheble, Nicholas "Data Diode Devices Secure Systems" retrieved at http://www.isssource.com/data-diode-devices-secure-systems, Jan. 25, 2012, 5 pages.

International Search Report and Written Opinion for PCT/US2015/020948 dated Jun. 12, 2015.

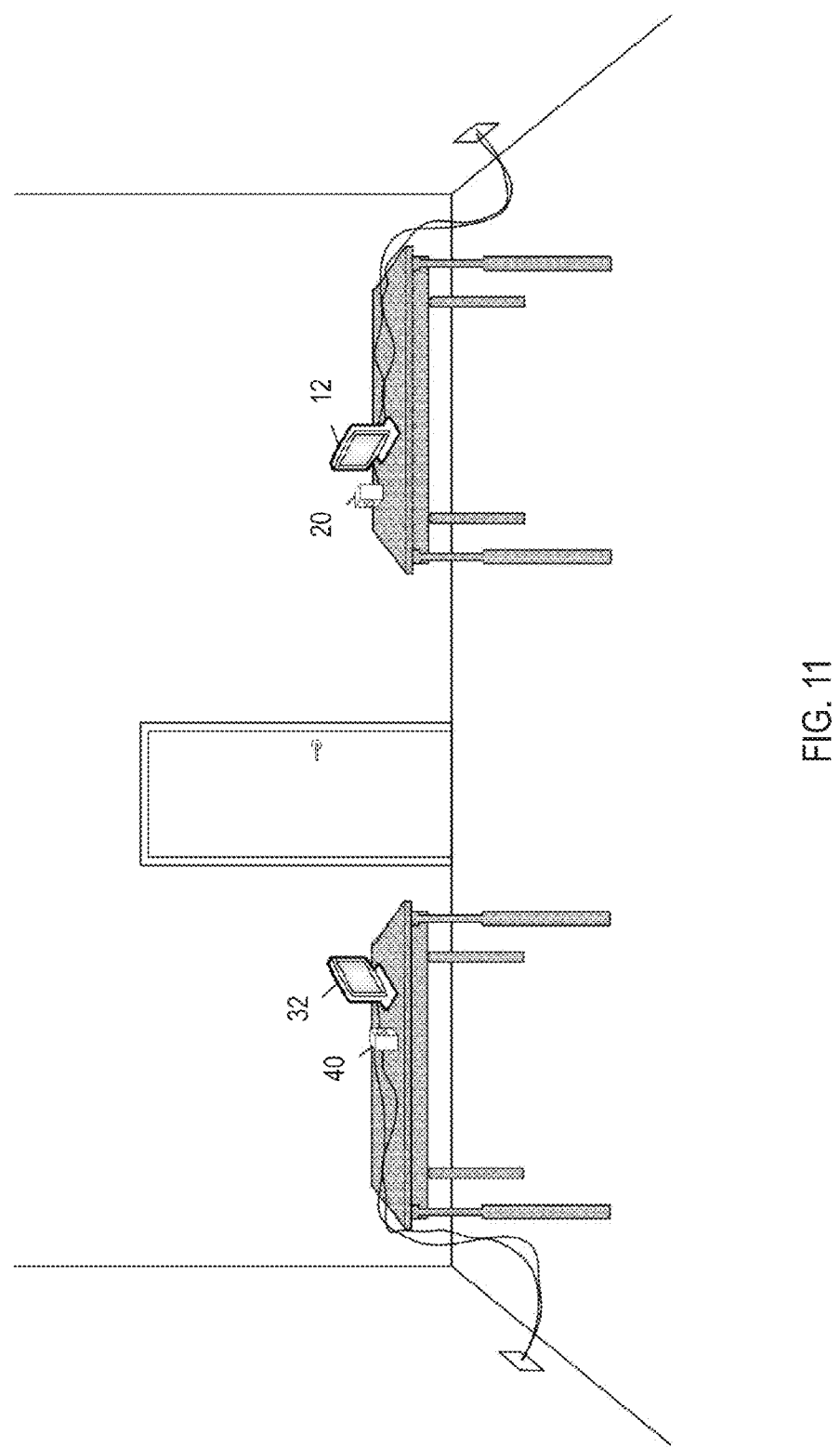

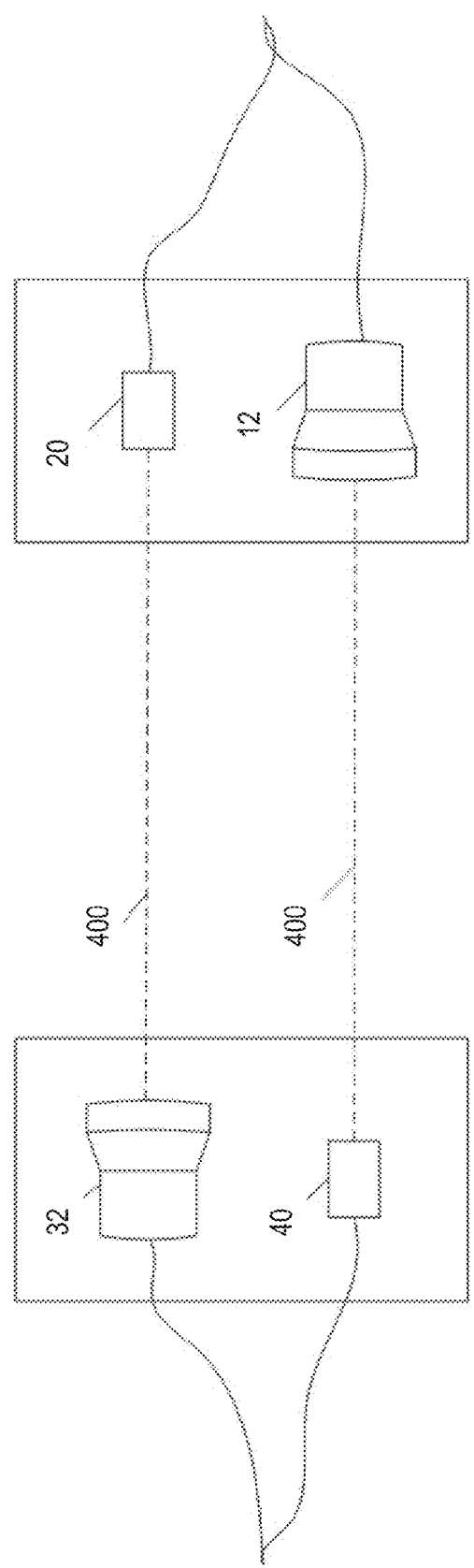

SYSTEMS, METHODS, AND COMPUTER MEDIUM TO SECURELY TRANSFER LARGE VOLUMES OF DATA BETWEEN PHYSICALLY ISOLATED NETWORKS HAVING DIFFERENT LEVELS OF NETWORK PROTECTION

RELATED APPLICATIONS

This application relates to, claims priority to and the benefit of, and incorporates by reference herein U.S. Provisional Patent Application No. 61/954,237, titled "Systems, Methods, and Computer Medium to Securely Transfer Data Between Networks Having Different Levels of Network Protection" and filed on Mar. 17, 2014. This application further relates to, claims priority to and the benefit of, and incorporates by reference herein U.S. Non-Provisional patent application Ser No. 14/33,6154, titled "Systems, Methods, and Computer Medium to Securely Transfer Business Transactional Data Between Networks Having Different Levels of Network Protection Using Barcode Technology with Data Diode Network Security Appliance" and filed the same day, Jul. 21, 2014, and concurrently herewith; U.S. Non-Provisional patent application Ser No. 14/33,6395, titled "Systems, Methods, and Computer Medium to Securely Transfer Business Transactional Data Between Physically Isolated Networks Having Different Levels of Network Protection Utilizing Barcode Technology" and filed the same day, Jul. 21, 2014, and concurrently herewith; and U.S. Non-Provisional patent application Ser No. 14/336,442, titled "Systems, Methods, and Computer Medium to Securely Transfer Backup Data Between Physically Isolated Networks Having Different Levels of Network Protection" and filed the same day, Jul. 21, 2014, and concurrently herewith.

BACKGROUND OF THE INVENTION

1. Field of the Invention

Embodiments of the invention relate to computer and data networks and, more particularly, to systems, methods, and non-transitory computer-readable medium having one or more computer programs stored therein to transfer data between networks.

2. Description of the Related Art

Organizations and entities that have multiple networks sometimes protect those networks from unauthorized access by establishing different, higher security or protection levels for one or more networks. For example, an entity may choose to establish stronger protections for one network—such as a process automation system network—that the entity prioritizes as more important, or even essential, to its operations than for another network—such as a corporate business network, for instance. Many industries, entities, and government agencies use one or more networks that require a higher level of security but nevertheless must be able to communicate with other, lower security networks. These high-security networks, therefore, may be physically isolated from other networks. In some circumstances, a high-security network must be totally isolated from other networks. That is, the high-security network must have no path of communication with other networks.

In the process automation industry, for example, network security may be essential to an entity's ability to maintain production at production facilities. It also may be important to the health and security of employees at production facilities, as well as part of environmental protection strategies. It has grown more difficult over time, however, to ensure the integrity of process automation systems. One reason behind the increasing difficulty is that newer process automation systems incorporate open system designs, which are more difficult to protect than legacy process automation systems. Newer process automation systems' combined use of open networking equipment, which transfers data using TCP/IP communication protocols, and widely-used operating systems, such as Microsoft Windows, has meant that corporate business networks and process automation system networks may be seamlessly integrated. That is, ease of communication between corporate business networks and process automation system networks has increased. Although the increased ease of communication may have some advantages, it has also exposed critical process automation system networks to new vulnerabilities.

Process automation and control engineers are constantly working to secure process automation systems from unauthorized intrusion and virus infection. Some of the approaches they use include anti-virus patch management, Microsoft Windows patch management, network designs (such as demilitarized zones) that eliminate direct communication between a low-security network and a high-security network, Microsoft Windows operating system hardening, constant firewall and network screening (e.g., 24/7/365), process automation system user accounts and password management, and access control lists for network equipment. Technicians and engineers, for example, may follow a depth in defense strategy, such as the standards outlined in ISA-99, "Industrial Automation and Control Systems Security," or in the United States Department of Homeland Security's "Chemical Facilities Anti-Terrorism Standards," or in standards developed by the Nuclear Regulatory Commission as a protocol or regimen to defend against the unauthorized intrusions. Even when these protective measures are used, however, process automation systems are still vulnerable because data can be transferred from a low-security network, such as a corporate business network, to the process automation system network when data is "written" to the process automation system network for business continuity purposes.

To prevent an intruder or virus from reaching a process automation system network or compromising a process automation system, organizations and other entities have taken several protective measures to prevent a low-security network from "writing" data to the process automation system network through traditional networking practices. For example, entities sometimes use demilitarized zones (DMZs), as illustrated in FIG. 7. As depicted, a company wide area network 202 is in communication with the Internet 201 and a corporate business server 203, as will be understood by those skilled in the art. Together, the company wide area network 202 and corporate business server 203 may form a corporate network for an entity. A separate process automation system network includes two process automation system servers 221 and 222, which are in communication with one another through a network switch 208. As illustrated in FIG. 7, a DMZ may protect the process automation system network. That is, although data transfer is bidirectional between a facility business server 220 and the process automation system servers 221 and 222, transferred data passes through the network switch 208, a firewall 207, a DMZ router 205, and a DMZ switch 206. Data transfer is also bidirectional between the facility business server 220 and the corporate business server 203, but transferred data passes through a different firewall 204, a DMZ router 205, and a DMZ switch 206.

SUMMARY OF THE INVENTION

Applicants have recognized that although the use of a DMZ, for example, can reduce risks of intrusion or compromise of a high-security network, such as a process automation system network, the use of a DMZ does not eliminate or adequately reduce some types of risks. Consequently, embodiments of systems, methods, and non-transitory computer-readable medium having one or more computer programs stored therein that address these problems and sources of problems are provided herein. Embodiments of the invention, for example, can include systems, methods, and non-transitory computer-readable medium having one or more computer programs stored therein to transfer data between two or more networks configured to have different levels of network protection.

A computer-implemented method to transfer data between two or more networks configured to have different levels of network protection, according to an embodiment of the invention, for example, can include decoding a first set of one or more barcodes. Data to be transferred can include one or more types of digitally stored information, such as transactional database records, for example. The one or more barcodes can be indicative of contents of a plurality of transactional database records and can thereby define one or more data barcodes. The plurality of transactional database records can be associated with and positioned within a first network, for example. Decoding the one or more data barcodes can produce contents of the plurality of transactional database records represented by the one or more data barcodes. Decoding the one or more data barcodes can further be responsive to receipt of a scan of a display of a first computer in communication with and positioned within the first network. The scan of the display of the first computer can be by use of one or more barcode scanning devices in communication with a second computer. Further, the second computer can be positioned remote from the first computer and in communication with and positioned within a second network. The second network, in turn, can be configured to have a different level of network security protection than the first network. The second network can also be configured to allow only one-way secure communication from the second network to the first network.

A method can also include decoding a second set of one or more different barcodes indicative of contents of one or more validation files to thereby define one or more validation barcodes. The one or more validation barcodes can be configured to encode contents of the one or more validation files, for example. Decoding the one or more validation barcodes can thus produce contents of the one or more validation files represented by the one or more validation barcodes. The one or more validation files can be configured to include decoded contents of the plurality of transactional database records. Decoding the one or more validation barcodes can also be responsive to receipt of a scan of a display of the second computer by use of a different one or more barcode scanning devices in communication with the first computer. As a result, decoding the one or more validation barcodes can thereby securely communicate decoded contents of the plurality of transactional database records in one-way communication from temporary storage associated with the second network to the first network for comparison to contents of the plurality of transactional database records associated with the first network.

A method can further include decoding a third set of one or more different barcodes indicative of contents of one or more verification files to thereby define one or more verification barcodes. The one or more verification barcodes can be configured to encode contents of the one or more verification files. Additionally, the one or more verification files can be configured to indicate success of transmission of contents of the plurality of transactional database records from the first network to the second network. Decoding the one or more verification barcodes can thus produce contents of the one or more verification files represented by the one or more verification barcodes. Decoding the one or more verification barcodes can further be responsive to receipt of a scan of the display of the first computer by use of the one or more barcode scanning devices in communication with the second computer. A method can then include storing decoded contents of the plurality of transactional database records in more permanent storage associated with the second network, responsive to an indication from decoded contents of the one or more verification files of successful transmission of contents of the plurality of transactional database records associated with the first network to the second network.

The plurality of transactional database records can be associated with one or more data historians, for example. Further, in some instances, the one or more barcode scanning devices in communication with the second computer can be configured to scan a plurality of barcodes simultaneously. Likewise, the one or more barcode scanning devices in communication with the first computer can be configured to scan a plurality of barcodes simultaneously.

Further, a method can include additional steps. For example, a method can also include generating the one or more data barcodes on the display of the first computer and transferring decoded contents of the plurality of transactional database records to temporary storage associated with the second network after decoding the one or more data barcodes. A method can then include generating the one or more validation barcodes on the display of the second computer. In addition, a method can include—after decoding the one or more validation barcodes—transferring decoded contents of the one or more validation files to temporary storage associated with the first network. Transferring decoded contents of the one or more validation files can thereby transfer decoded contents of the plurality of transactional database records to the first network for comparison to contents of the plurality of transactional database records. In some circumstances, a method can further include generating the one or more verification barcodes on the display of the first computer, responsive to a comparison of (1) the securely communicated decoded contents of the plurality of transactional database records and (2) contents of the plurality of transactional database records positioned in the first network. A method can still further include discarding decoded contents of the plurality of transactional database records in temporary storage associated with the second network. Discarding decoded contents of the plurality of transactional database records in temporary storage associated with the second network can be responsive to an indication—from decoded contents of the one or more verification files—of unsuccessful transmission of contents of the plurality of transactional database records to the second network.

In some circumstances, the first network can be a high-security network, and the second network can be a low-security network. Conversely, in other circumstances, the first network can be a low-security network, and the second network can be a high-security network. Further, in some instances, decoding the one or more data barcodes can include disregarding error-correction capabilities of the one or more data barcodes.

Barcodes and a barcode scanning device can include additional distinctive features. For example, in some cases, the one or more data barcodes, the one or more validation barcodes, and the one or more verification barcodes can include one or more of the following: two-dimensional matrix codes, QR Codes, Aztec Codes, and PDF417 codes. In addition, a barcode scanning device can include one or more of the following: a barcode reading device, a QR Code reading device, a field-of-view barcode reading device, and a camera.

An embodiment can also include systems to transfer data between two or more networks configured to have different levels of network protection. For example, a system can include a first computer and a second computer. The first computer can be in communication with and positioned within a first network, and the second computer can be positioned remote from the first computer and in communication with and positioned within a second network. The first computer, for example, can include one or more processors and one or more barcode scanning devices in communication with the one or more processors. The first computer can also include one or more displays in communication with the one or more processors and non-transitory memory medium in communication with the one or more processors. The memory medium can include computer-readable instructions stored therein that when executed cause the first computer to perform the step of decoding a first set of one or more barcodes indicative of contents of one or more validation files. The one or more barcodes can thereby define one or more validation barcodes, for example, which can be configured to encode contents of the one or more validation files. Decoding the one or more validation barcodes can be responsive to receipt of a scan of one or more of one or more displays of the second computer by use of the one or more barcode scanning devices of the first computer. Further, decoding the one or more validation barcodes can produce contents of the one or more validation files represented by the one or more validation barcodes.

The second network can be configured to have temporary storage and separate more permanent storage associated therewith. In addition, the second network can be further configured to have a different level of network security protection than the first network and to allow only one-way secure communication from the second network to the first network. The second computer, for example, can include one or more processors and one or more input and output units in communication with the one or more processors of the second computer. The second computer can further include one or more displays in communication with the one or more processors of the second computer and another different one or more barcode scanning devices in communication with the one or more processors of the second computer. Additionally, the second computer can include non-transitory memory medium in communication with the one or more processors of the second computer. The memory medium of the second computer can include computer-readable instructions stored therein that when executed cause the second computer to perform a series of steps. For example, the steps can include decoding a second set of a different one or more barcodes indicative of contents of a plurality of transactional database records to thereby define one or more data barcodes. The plurality of transactional database records can be associated with and positioned within the first network, and decoding the one or more data barcodes can thus produce contents of the plurality of transactional database records represented by the one or more data barcodes. Decoding the one or more data barcodes can further be responsive to receipt of a scan of one or more of the one or more displays of the first computer by use of the one or more barcode scanning devices of the second computer. The steps can also include generating the one or more validation barcodes on one or more of the one or more displays of the second computer. The one or more validation files can be configured to include decoded contents of the plurality of transactional database records. As a result, generating the one or more validation barcodes can thereby securely communicate decoded contents of the plurality of transactional database records in one-way communication from the temporary storage associated with the second network to the first network for comparison to contents of the plurality of transactional database records associated with the first network. The steps can further include decoding a third set of one or more different barcodes indicative of contents of one or more verification files to thereby define one or more verification barcodes. The one or more verification barcodes can be configured to encode contents of the one or more verification files, and the one or more verification files can be configured to indicate success of transmission of contents of the plurality of transactional database records from the first network to the second network. Decoding the one or more verification barcodes can be responsive to receipt of a scan of one or more of the one or more displays of the first computer by use of the one or more barcode scanning devices of the second computer. The steps can still further include storing decoded contents of the plurality of transactional database records in the more permanent storage associated with the second network, responsive to an indication from decoded contents of the one or more verification files of successful transmission of contents of the plurality of transactional database records associated with the first network to the second network.

The plurality of transactional database records can be associated with one or more data historians, for example. Further, in some instances, the one or more barcode scanning devices of the second computer can be configured to scan a plurality of barcodes simultaneously. Likewise, the one or more barcode scanning devices of the first computer can be configured to scan a plurality of barcodes simultaneously.

In some circumstances, the memory medium of the first computer can also include computer-readable instructions stored therein that when executed cause the first computer to perform additional steps, such as generating the one or more data barcodes on one or more of the one or more displays of the first computer. Additional steps performed by the first computer can also include transferring decoded contents of the one or more validation files to temporary storage associated with the first network after decoding the one or more validation barcodes. Transferring decoded contents of the one or more validation files can thereby transfer decoded contents of the plurality of transactional database records to the first network for comparison to contents of the plurality of transactional database records. Other steps performed by the first computer can also include generating the one or more verification barcodes on one or more of the one or more displays of the first computer, responsive to a comparison of (1) the securely communicated decoded contents of the plurality of transactional database records and (2) contents of the plurality of transactional database records positioned in the first network. Similarly, the memory medium of the second computer can further include computer-readable instructions stored therein that when executed cause the second computer to perform additional steps. Additional steps performed by the second computer can include, for example, transferring decoded contents of the plurality of transactional database records to temporary storage associated with the second network after decoding the one or more data barcodes, as well as generating the one or more validation barcodes on one or more of the one or more displays of the second computer. Other steps performed by the second computer can also include discarding decoded contents of the plurality of transactional database records in temporary storage associated with the second network, responsive to an indication from decoded contents of the one or more verification files of unsuccessful transmission of contents of the plurality of transactional database records to the second network.

In some circumstances, the first network can be a high-security network, and the second network can be a low-security network. In other circumstances, the first network can be a low-security network, and the second network can be a high-security network. Decoding the one or more data barcodes, in some instances, can include disregarding error-correction capabilities of the one or more data barcodes. Further, the one or more data barcodes, the one or more validation barcodes, and the one or more verification barcodes can include one or more of the following: two-dimensional matrix codes, QR Codes, Aztec Codes, and PDF417 codes. In addition, a barcode scanning device can also include one or more of the following: a barcode reading device, a QR Code reading device, a field-of-view barcode reading device, and a camera.

An embodiment of the invention can additionally include non-transitory computer-readable medium having one or more computer programs stored therein operable by one or more processors to transfer data between two or more networks configured to have different levels of network protection. The one or more computer programs, for example, can include a set of instructions that, when executed by the one or more processors, cause the one or more processors to perform operations. Those operations can include decoding a first set of one or more barcodes indicative of contents of a plurality of transactional database records to thereby define one or more data barcodes. The plurality of transactional database records can be associated with and positioned within a first network. Decoding the one or more data barcodes can be responsive to receipt of a scan of a display of a first computer in communication with and positioned within the first network. A scan of the display of the first computer can be by use of one or more barcode scanning devices in communication with a second computer. The second computer can be positioned remote from the first computer and in communication with and positioned within a second network. Further, the second network can be configured to have a different level of network security protection than the first network and to allow only one-way secure communication from the second network to the first network. Decoding the one or more data barcodes can thus produce contents of the plurality of transactional database records represented by the one or more data barcodes.

The operations can further include decoding a second set of one or more different barcodes indicative of contents of one or more validation files to thereby define one or more validation barcodes. The one or more validation barcodes can be configured to encode contents of the one or more validation files, and decoding the one or more validation barcodes can thus produce contents of the one or more validation files represented by the one or more validation barcodes. The one or more validation files can be configured to include decoded contents of the plurality of transactional database records. Decoding the one or more validation barcodes can be responsive to receipt of a scan of a display of the second computer. A scan of the display of the second computer can be by use of a different one or more barcode scanning devices in communication with the first computer, for example. Consequently, decoding the one or more validation barcodes can thereby securely communicate decoded contents of the plurality of transactional database records in one-way communication from temporary storage associated with the second network to the first network for comparison to contents of the plurality of transactional database records associated with the first network.

The operations can also include decoding a third set of one or more different barcodes indicative of contents of one or more verification files to thereby define one or more verification barcodes. The one or more verification barcodes can be configured to encode contents of the one or more verification files. Decoding the one or more verification barcodes can thus produce contents of the one or more verification files represented by the one or more verification barcodes. Further, the one or more verification files can be configured to indicate success of transmission of contents of the plurality of transactional database records from the first network to the second network. Decoding the one or more verification barcodes can be responsive to receipt of a scan of the display of the first computer by use of the one or more barcode scanning devices in communication with the second computer. The operations can then include storing decoded contents of the plurality of transactional database records in more permanent storage associated with the second network, responsive to an indication from decoded contents of the one or more verification files of successful transmission of contents of the plurality of transactional database records associated with the first network to the second network.

The plurality of transactional database records can be associated with one or more data historians, for example. Further, in some instances, the one or more barcode scanning devices in communication with the second computer can be configured to scan a plurality of barcodes simultaneously. Likewise, the one or more barcode scanning devices in communication with the first computer can be configured to scan a plurality of barcodes simultaneously.

In addition, the operations can also include generating the one or more data barcodes on the display of the first computer, in some circumstances. Further, the operations can include transferring decoded contents of the plurality of transactional database records to temporary storage associated with the second network after decoding the one or more data barcodes, as well as generating the one or more validation barcodes on the display of the second computer. The operations can still further include transferring decoded contents of the one or more validation files to temporary storage associated with the first network after decoding the one or more validation barcodes. Transferring decoded contents of the one or more validation files can thereby transfer decoded contents of the plurality of transactional database records to the first network for comparison to contents of the plurality of transactional database records. In addition, the operations can include generating the one or more verification barcodes on the display of the first computer, responsive to a comparison of (1) the securely communicated decoded contents of the plurality of transactional database records and (2) contents of the plurality of transactional database records positioned in the first network. Furthermore, the operations can include discarding decoded contents of the plurality of transactional database records in temporary storage associated with the second network, responsive to an indication from decoded contents of the one or more verification files of unsuccessful transmission of contents of the plurality of transactional database records to the second network.

In some circumstances, the first network can be a high-security network, and the second network can be a low-security network. In other circumstances, the first network can be a low-security network, and the second network can be a high-security network. Further, decoding the one or more data barcodes can include disregarding error-correction capabilities of the one or more data barcodes. In some instances, the one or more data barcodes, the one or more validation barcodes, and the one or more verification barcodes can include one or more of the following: two-dimensional matrix codes, QR Codes, Aztec Codes, and PDF417 codes. In addition, a barcode scanning device can include one or more of the following: a barcode reading device, a QR Code reading device, a field-of-view barcode reading device, and a camera.

As an example, an embodiment can be used to transmit large volumes of data between a high-security network and a low-security network. For instance, the plurality of transactional database records can be associated with one or more data historians. An embodiment can be used to transmit continuously sampled data, such as temperature and pressure readings sampled many times every minute, from a process automation system network to a corporate network, for example. In such an embodiment, a plurality of data barcodes can be used to encode the plurality of transactional database records to be transmitted from the process automation system network to the corporate network. The plurality of data barcodes can be generated on one or more displays of the first computer, which can be in communication with and positioned within the process automation system network, and a large field-of-view barcode scanning device in communication with the second computer, which can be in communication with and positioned within the corporate network, can be used to scan the one or more displays. When many displays are used to generate many data barcodes simultaneously, transactional database records can be transmitted at high speeds. Consequently, an embodiment can enable continuous, rapid transmission of data between networks, e.g., in real time as data is sampled. This rapid, secure transmission capability can be particularly advantageous for transferring data that is continuously being created, such as, for example, sampled data related to process automation systems.

In some circumstances, a physically secured room can be used to house one or more components of the first computer and the second computer. A physically secured room, e.g., a "clean room," can include a secure, restricted-access room into which removable media is not permitted. Data transfers according to an embodiment of the invention can be performed in a physically secured room, for instance, to further increase security protection of a high-security network. For example, a physically secured room can contain at least a display of the first computer and a barcode scanning device in communication with the second computer. The barcode scanning device can be positioned so as to enable it to capture one or more barcodes on the display of the first computer. A physically secured room can also contain a display of the second computer and a different barcode scanning device in communication with the first computer. The barcode scanning device in communication with the first computer can similarly be positioned so as to enable it to capture one or more barcodes on the display of the second computer. As a result, transmission of transactional database records from one network to another, according to an embodiment of the invention, can occur at least partially in a physically secured room environment. The use of a physically secured room can therefore further minimize or eliminate any risk of intrusion or unauthorized access to a high-security network, for example.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 11 is an environmental view of a physically secured room containing a system to transfer data between two or more networks configured to have different levels of network protection according to an embodiment of the invention.

FIG. 12 is an environmental view of a physically secured room containing a system to transfer data between two or more networks configured to have different levels of network protection according to an embodiment of the invention.

DETAILED DESCRIPTION OF THE INVENTION

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Figure 4:
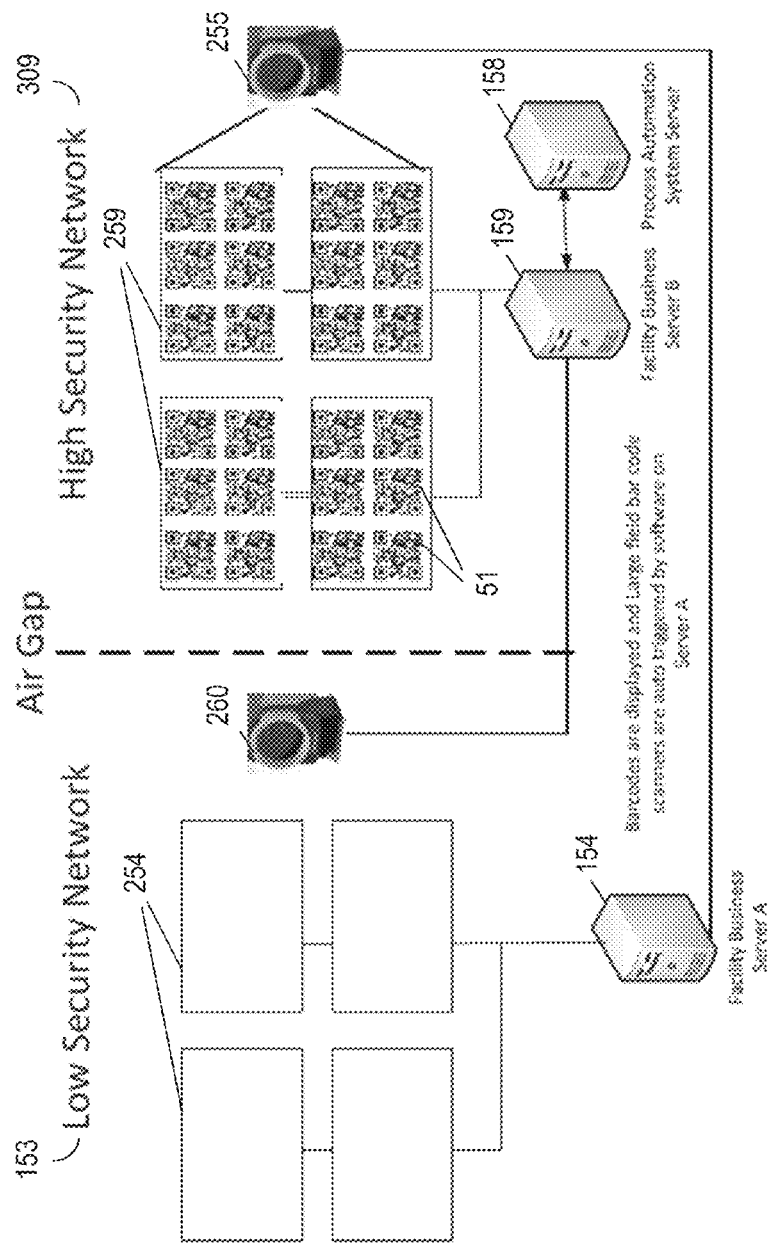
FIG. 4 is a schematic diagram of a system to transfer data between two or more networks configured to have different levels of network protection according to an embodiment of the invention.
Figure 14:
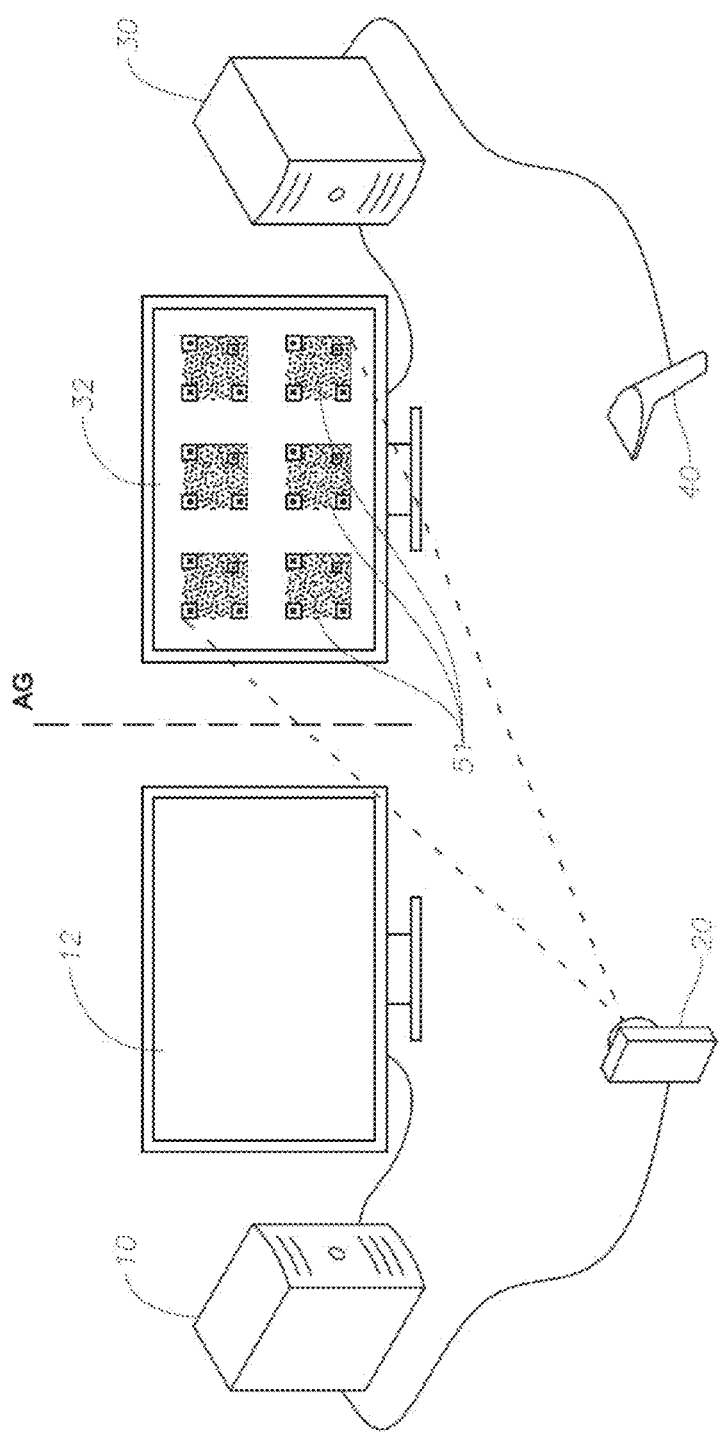
FIG. 14 is a schematic diagram of a system to transfer data between two or more networks configured to have different levels of network protection according to an embodiment of the invention.
Figure 15:
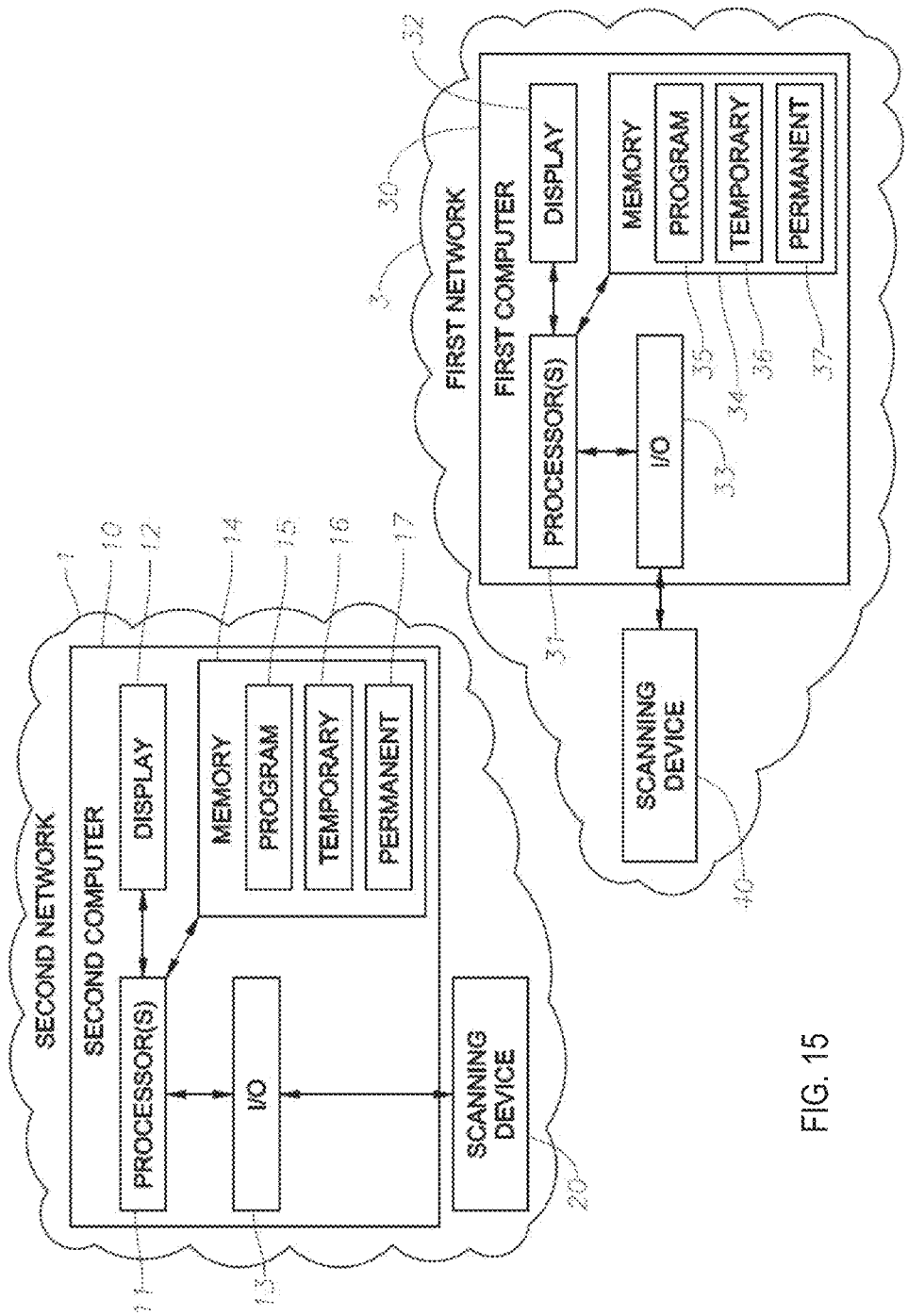
FIG. 15 is a schematic diagram of a system to transfer data between two or more networks configured to have different levels of network protection according to an embodiment of the invention.

A computer-implemented method to transfer data between two or more networks configured to have different levels of network protection, according to an embodiment of the invention, for example, can include decoding a first set of one or more barcodes. The one or more barcodes can be indicative of contents of a plurality of transactional database records and can thereby define one or more data barcodes 51, as illustrated in FIG. 4, for example. The plurality of transactional database records can be associated with and positioned within a first network 3, as illustrated in FIG. 15, for example. Further, decoding the one or more data barcodes 51 can produce contents of the plurality of transactional database records represented by the one or more data barcodes 51. Decoding the one or more data barcodes 51 can be responsive to receipt of a scan of a display 32 of a first computer 30 in communication with and positioned within the first network 3, for example. The scan of the display 32 of the first computer 30 can be by use of one or more barcode scanning devices 20 in communication with a second computer 10, as illustrated in FIG. 14, for example. Further, the second computer 10 can be positioned remote from the first computer 30 and in communication with and positioned within a second network 1. The second network 1, in turn, can be configured to have a different level of network security protection than the first network 3. The second network 1 can also be configured to allow only one-way secure communication from the second network 1 to the first network 3.

Figure 5:
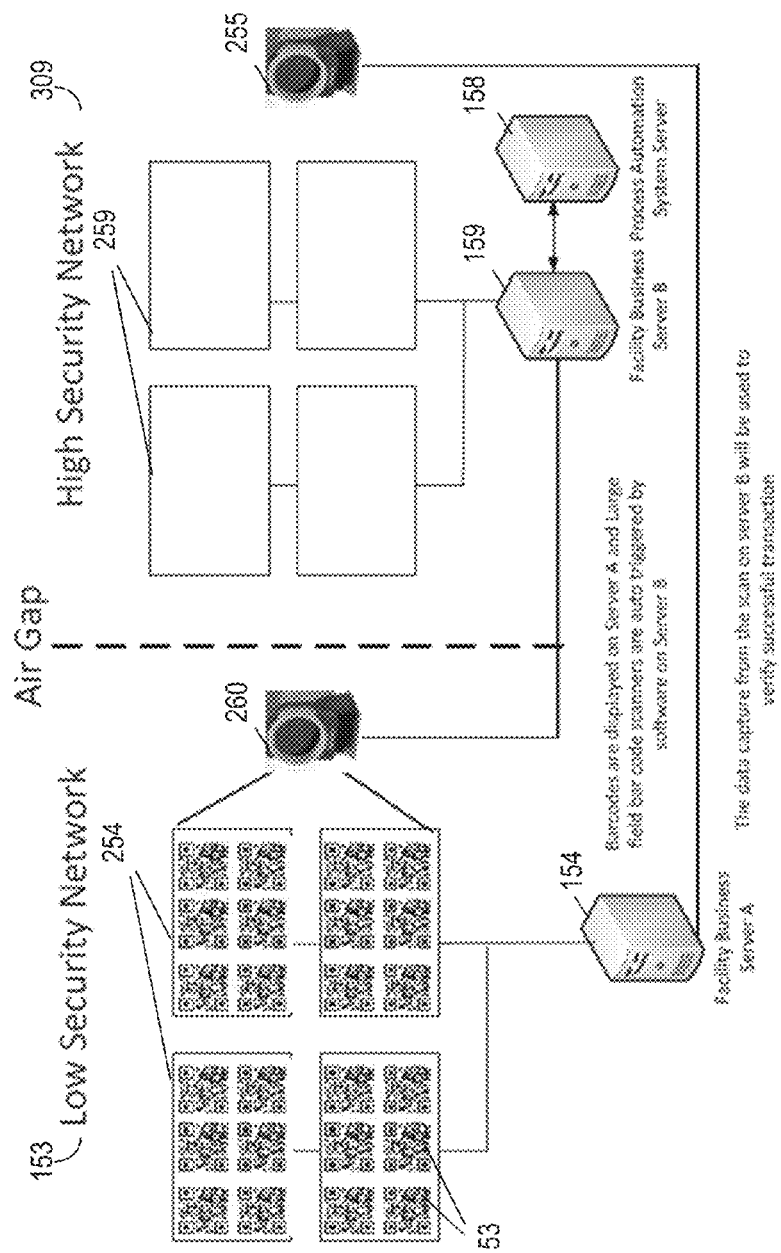
FIG. 5 is a schematic diagram of a system to transfer data between two or more networks configured to have different levels of network protection according to an embodiment of the invention.

A method can also include decoding a second set of one or more different barcodes indicative of contents of one or more validation files to thereby define one or more validation barcodes 53, as illustrated in FIG. 5, for example. The one or more validation barcodes 53 can be configured to encode contents of the one or more validation files, for example. Decoding the one or more validation barcodes 53 can thus produce contents of the one or more validation files represented by the one or more validation barcodes 53. The one or more validation files can be configured to include decoded contents of the plurality of transactional database records as received by use of the one or more data barcodes 51. Decoding the one or more validation barcodes 53 can also be responsive to receipt of a scan of a display 12 of the second computer 10 by use of a different one or more barcode scanning devices 40 in communication with the first computer 30. As a result, decoding the one or more validation barcodes 53 can thereby securely communicate decoded contents of the plurality of transactional database records in one-way communication from temporary storage associated with the second network 1 to the first network 3 for comparison to contents of the plurality of transactional database records associated with the first network 3. Temporary storage associated with the second network 1 can include, for example, temporary storage 16 of the second computer 10, as illustrated, for example, in FIG. 15.

Figure 6:
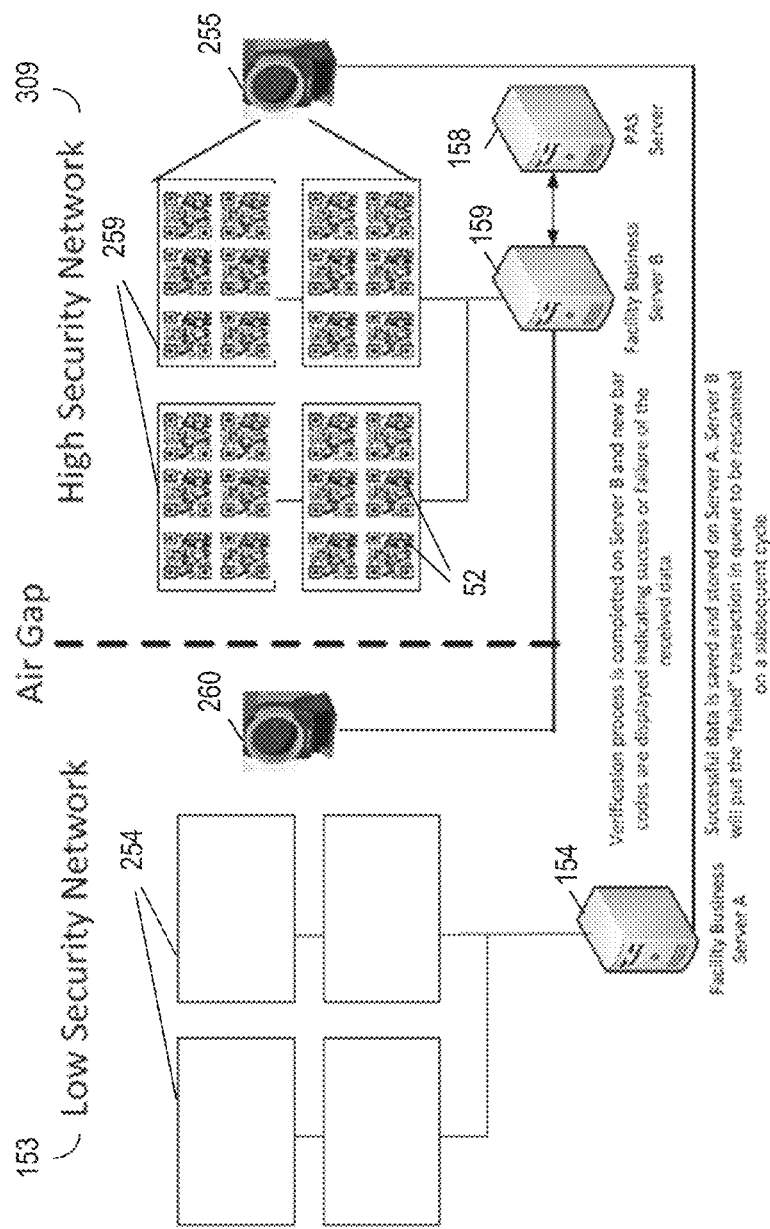
FIG. 6 is a schematic diagram of a system to transfer data between two or more networks configured to have different levels of network protection according to an embodiment of the invention.
Figure 7:
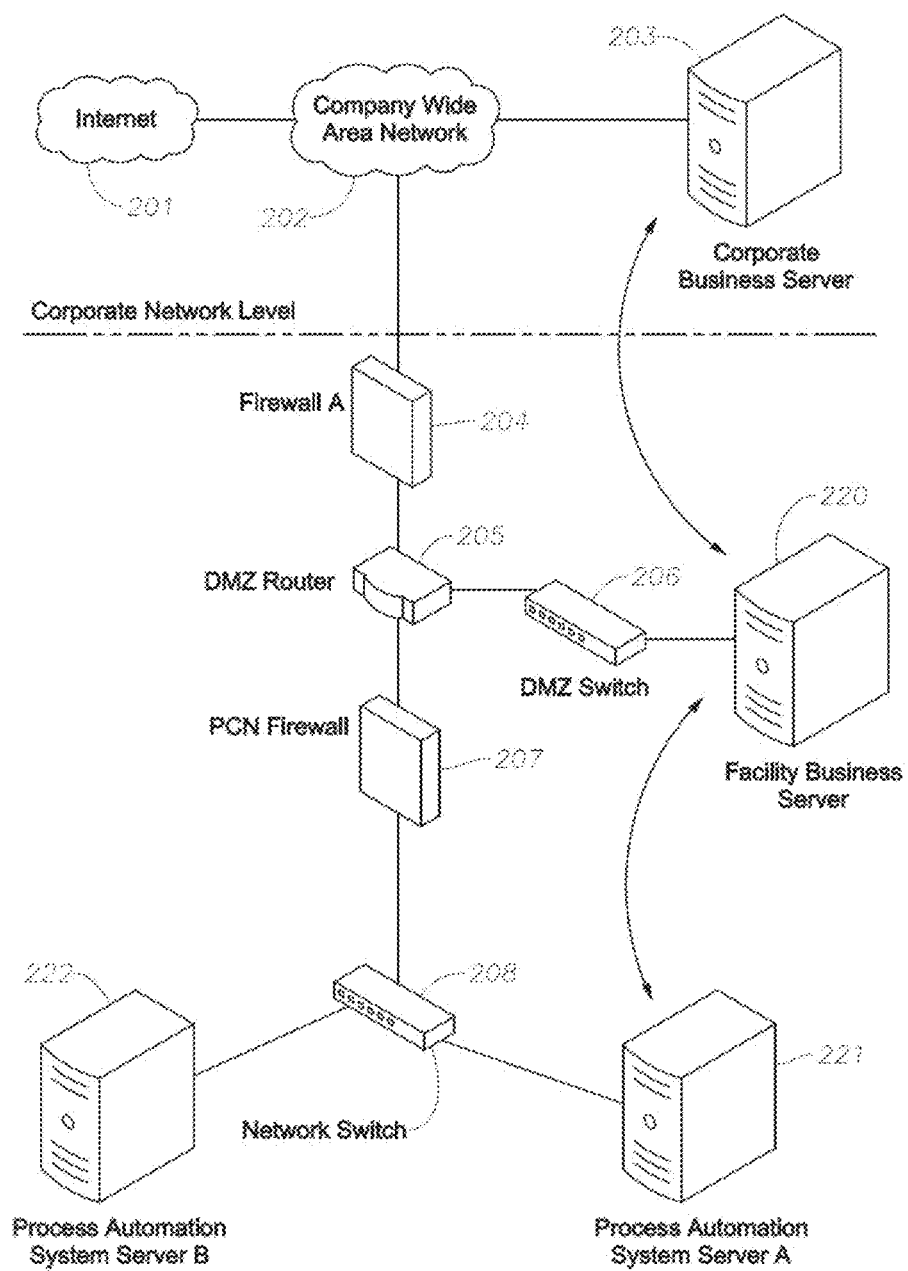
FIG. 7 is a schematic diagram of a system including a demilitarized zone (DMZ), according to the prior art.

A method can further include decoding a third set of one or more different barcodes indicative of contents of one or more verification files to thereby define one or more verification barcodes 52, as illustrated in FIG. 6, for example. The one or more verification barcodes 52 can be configured to encode contents of the one or more verification files. Additionally, the one or more verification files can be configured to indicate success of transmission of contents of the plurality of transactional database records from the first network 3 to the second network 1. Decoding the one or more verification barcodes 52 can thus produce contents of the one or more verification files represented by the one or more verification barcodes 52. Decoding the one or more verification barcodes 52 can further be responsive to receipt of a scan of the display 32 of the first computer 30 by use of the one or more barcode scanning devices 20 in communication with the second computer 10. A method can then include storing decoded contents of the plurality of transactional database records in more permanent storage associated with the second network 1, responsive to an indication from decoded contents of the one or more verification files of successful transmission of contents of the plurality of transactional database records associated with the first network 3 to the second network 1. More permanent storage associated with the second network 1 can include, for example, permanent storage 17 of the second computer 10, as illustrated, for example, in FIG. 15.

Figure 9:
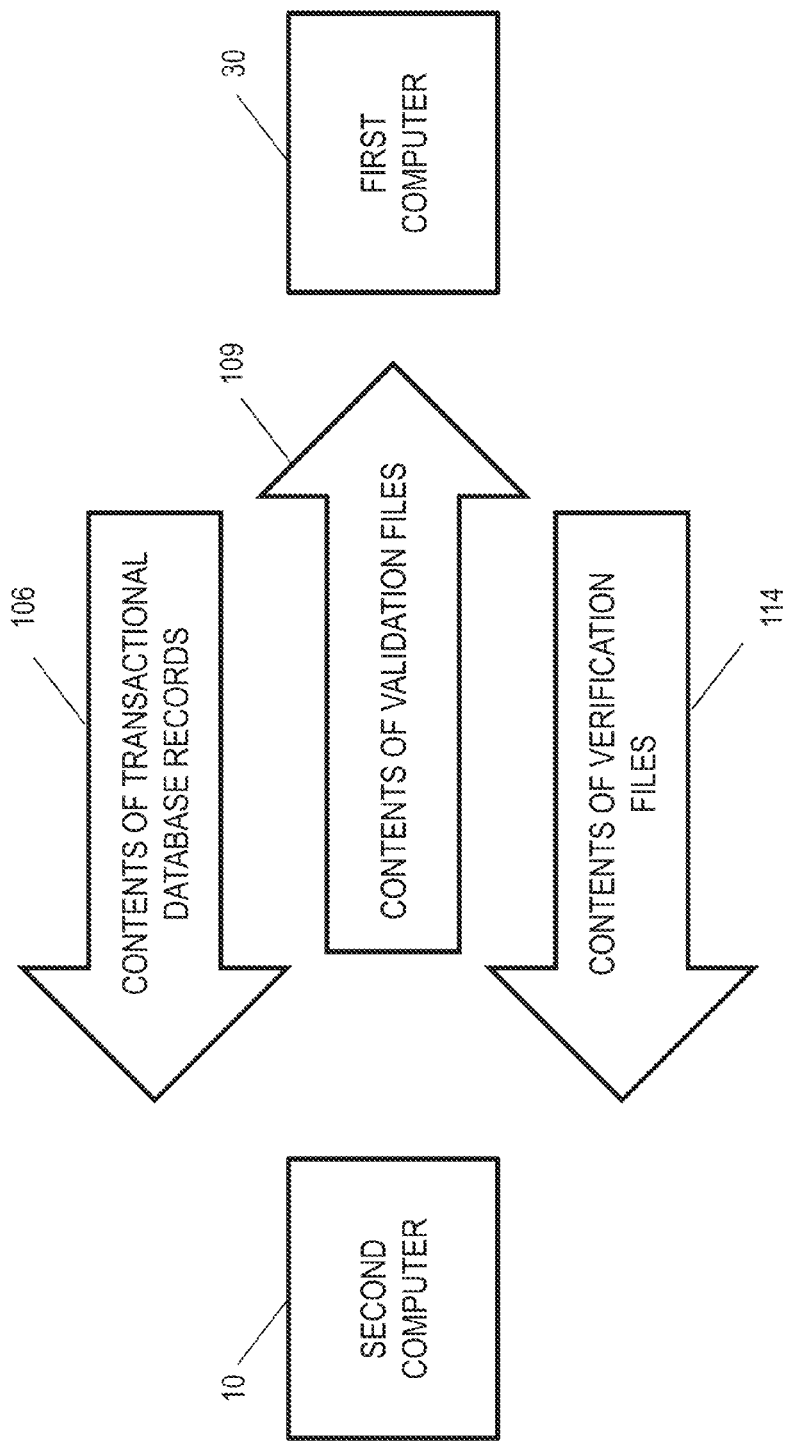
FIG. 9 is a schematic method flow diagram of a method to transfer data between two or more networks configured to have different levels of network protection according to an embodiment of the invention.

An exchange of information between the first computer 30 and the second computer 10 can thus include transmission of contents of transactional database records 106 encoded in data barcodes 51 from the first computer 30 to the second computer 10, transmission of contents of validation files (including decoded contents of the transactional database records) 109 from the second computer 10 to the first computer 30, and transmission of contents of verification files 114 from the first computer 30 to the second computer 10, as illustrated, for example, in FIG. 9.

The plurality of transactional database records can be associated with one or more data historians, for example. Further, in some instances, the one or more barcode scanning devices 20 in communication with the second computer 10 can be configured to scan a plurality of barcodes simultaneously. Likewise, the one or more barcode scanning devices 40 in communication with the first computer 30 can be configured to scan a plurality of barcodes simultaneously.

Further, a method can include additional steps. For example, a method can also include transferring decoded contents of the plurality of transactional database records to temporary storage associated with the second network 1 after decoding the one or more data barcodes 51. In addition, a method can include—after decoding the one or more validation barcodes 53—transferring decoded contents of the one or more validation files to temporary storage associated with the first network 3. For example, storage associated with the first network 3 can include temporary storage 36 or permanent storage 37 of the first computer 30, as illustrated, for example, in FIG. 15. Transferring decoded contents of the one or more validation files can thereby transfer decoded contents of the plurality of transactional database records to the first network 3 for comparison to contents of the plurality of transactional database records. In some circumstances, a method can further include generating the one or more data barcodes 51 on the display 32 of the first computer 30, for example, as well as generating the one or more validation barcodes 53 on the display 12 of the second computer 10. A method can also include generating the one or more verification barcodes 52 on the display 32 of the first computer 30, responsive to a comparison of (1) the securely communicated decoded contents of the plurality of transactional database records and (2) contents of the plurality of transactional database records positioned in the first network 3. A method can still further include discarding decoded contents of the plurality of transactional database records in temporary storage associated with the second network 1. Discarding decoded contents of the plurality of transactional database records in temporary storage associated with the second network 1 can be responsive to an indication—from decoded contents of the one or more verification files—of unsuccessful transmission of contents of the plurality of transactional database records to the second network 1.

In some circumstances, the first network 3 can be a high-security network, and the second network 1 can be a low-security network. Conversely, in other circumstances, the first network 3 can be a low-security network, and the second network 1 can be a high-security network. Further, in some instances, decoding the one or more data barcodes 51 can include disregarding error-correction capabilities of the one or more data barcodes 51.

Figure 10B:
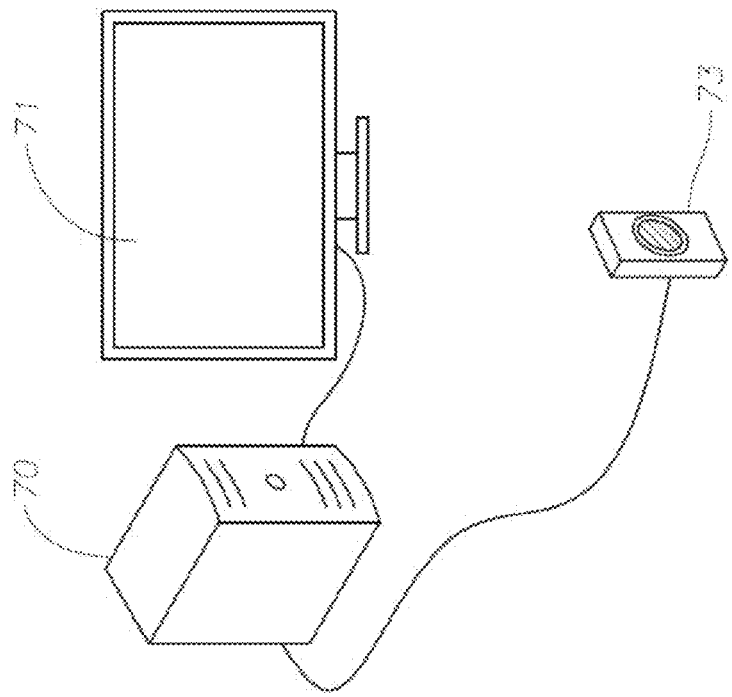
FIG. 10b is a schematic diagram of some of the elements of a system to transfer data between two or more networks configured to have different levels of network protection according to an embodiment of the invention.
Figure 10A:
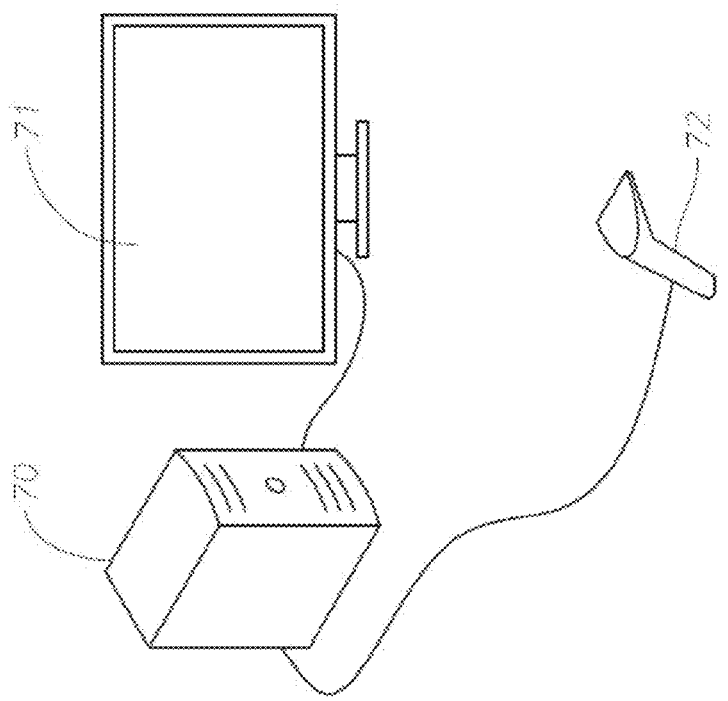
FIG. 10a is a schematic diagram of some of the elements of a system to transfer data between two or more networks configured to have different levels of network protection according to an embodiment of the invention.

Barcodes and barcode scanning devices can include additional distinctive features. For example, in some cases, the one or more data barcodes 51, the one or more validation barcodes 53, and the one or more verification barcodes 52 can include one or more of the following, as will be understood by those skilled in the art: two-dimensional matrix codes, QR Codes, Aztec Codes, and PDF417 codes. In addition, a barcode scanning device, such as a barcode scanning device 20 or a barcode scanning device 40, can include one or more of the following, as will be understood by those skilled in the art: a barcode reading device 72, a QR Code reading device, a field-of-view barcode reading device 73, and a camera, as illustrated, for example, in FIG. 10a and FIG. 10b. In FIG. 10a, a computer 70 is connected to a display 71 and a barcode reading device 72. Similarly, in FIG. 10b, a computer 70 is connected to a field-of-view barcode reading device 73, in addition to a display 71. A barcode scanning device 20 or a barcode scanning device 40 can have the ability to scan more than one barcode simultaneously.

Figure 8:
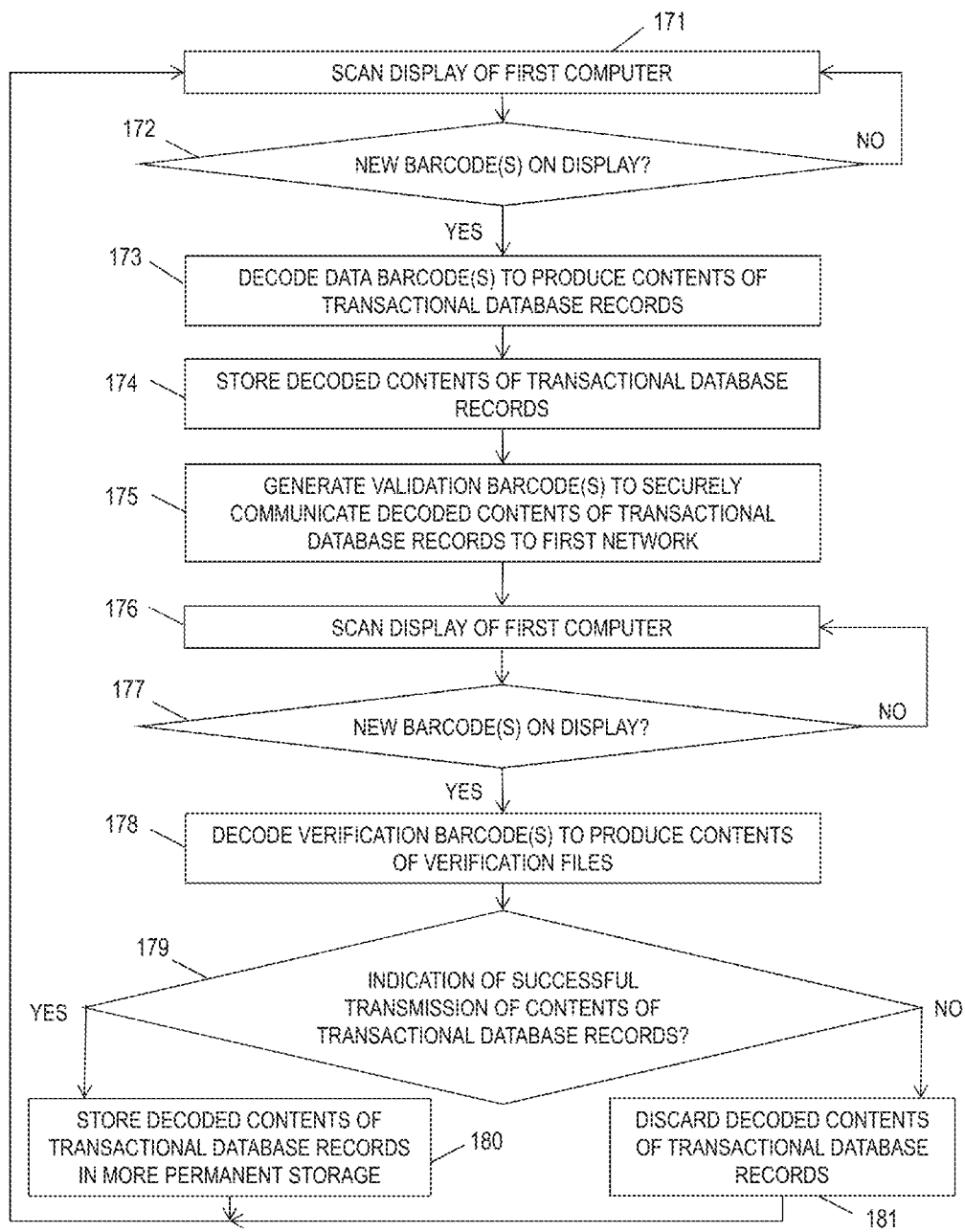
FIG. 8 is a schematic method flow diagram of a method to transfer data between two or more networks configured to have different levels of network protection according to an embodiment of the invention.

In some circumstances, a method can include steps performed by the second computer 10. For example, after scanning 171 a display 32 of a first computer 30, a method can include determining 172 whether one or more new data barcodes 51 are on the display 32, as illustrated, for example, in FIG. 8. If the display 32 does not depict any new data barcodes 51, a method can include scanning 171 the display 32 again. If the display 32 depicts one or more new data barcodes 51, a method can include decoding 173 the one or more data barcodes 51 to produce contents of the plurality of transactional database records. A method can then include storing 174 decoded contents of the plurality of transactional database records. A method can further include generating 175 one or more validation barcodes 53 on a display 12 of the second computer 10 to securely communicate decoded contents of the plurality of transactional database records to the first network 3. A method can still further include scanning 176 a display 32 of the first computer 30 then determining 177 whether one or more new verification barcodes 52 are on the display 32. If the display 32 does not depict any new verification barcodes 52, a method can include scanning 176 the display 32 again. If the display 32 depicts one or more new verification barcodes 52, a method can include decoding 178 the one or more verification barcodes 52 to produce contents of one or more verification files. A method can then include determining 179 whether decoded contents of the one or more verification files indicate a successful transmission of contents of the plurality of transactional database records associated with the first network 3 to the second network 1. If successful transmission is indicated, a method can include storing 180 decoded contents of the plurality of transactional database records in more permanent storage then scanning 171 a display 32 of the first computer 30 in anticipation of transmission of additional contents of transactional database records encoded in data barcodes 51. If unsuccessful transmission is indicated, a method can include discarding 181 decoded contents of the plurality of transactional database records then scanning 171 a display 32 of the first computer 30 in anticipation of transmission of additional contents of transactional database records encoded in data barcodes 51.

Figure 13:
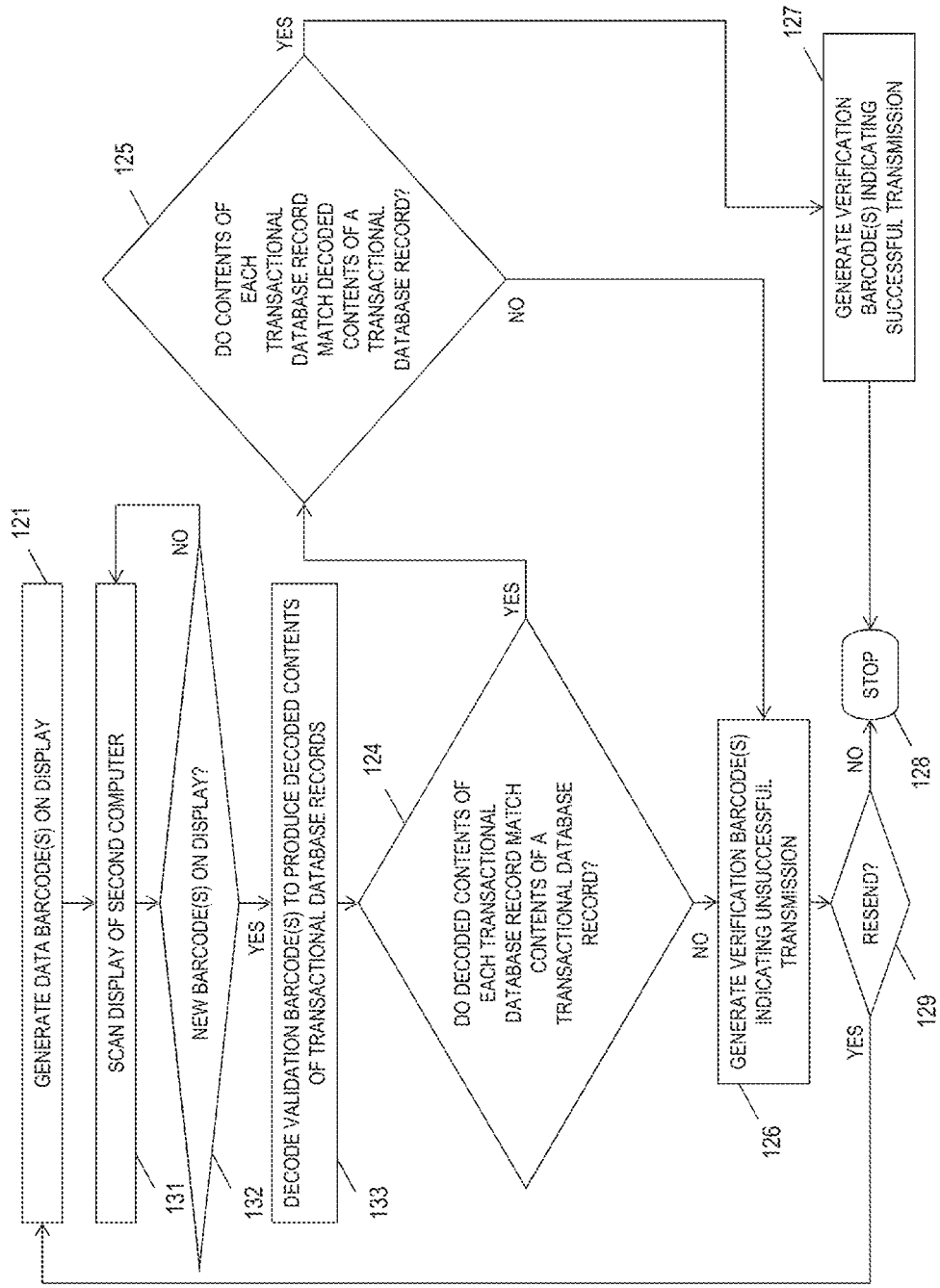
FIG. 13 is a schematic method flow diagram of a method to transfer data between two or more networks configured to have different levels of network protection according to an embodiment of the invention.

Similarly, a method can include steps performed by the first computer 30 in some circumstances. For example, as illustrated in FIG. 13, after generating 121 data barcodes 51 on a display 32 of the first computer 30, a method can include scanning 131 a display 12 of the second computer 10 then determining 132 whether new validation barcodes 53 are depicted on the display 12. If new validation barcodes 53 are not depicted on the display 12, a method can include scanning 131 a display 12 of the second computer 10 again. If new validation barcodes 53 are depicted on the display 12, a method can include decoding 133 the validation barcodes 53 to produce contents of the validation files, i.e., decoded contents of the plurality of transactional database records. A method can then include determining 124 whether securely communicated decoded contents of each transactional database record match contents of a transactional database record positioned in the first network 3. If so, a method can then include determining 125 whether contents of each transactional database record match securely communicated decoded contents of a transactional database record. If contents of each transactional database record match securely communicated decoded contents of a transactional database record, a method can include generating 127 one or more verification barcodes 52 indicating successful transmission of contents of the plurality of transactional database records from the first network 3 to the second network 1 then stopping 128. If not all securely communicated decoded contents of each transactional database record match contents of a transactional database record positioned in the first network 3—that is, if step 124 is determined to be "no"—or if not all contents of each transactional database record match securely communicated decoded contents of a transactional database record—that is, if step 125 is determined to be "no"—a method can include generating 126 one or more verification barcodes 52 indicating unsuccessful transmission of contents of the plurality of transactional database records from the first network 3 to the second network 1. A method can then include determining 129 whether to resend contents of the plurality of transactional database records. If contents of the plurality of transactional database records are not to be resent, a method can stop 128. If contents of the plurality of transactional database records are to be resent, a method can include again generating 121 data barcodes 51 on a display 32 of the first computer 30.

An embodiment can also include systems to transfer data between two or more networks configured to have different levels of network protection. For example, a system can include a first computer 30 and a second computer 10. The first computer 30 can be in communication with and positioned within a first network 3, and the second computer 10 can be positioned remote from the first computer 30 and in communication with and positioned within a second network 1. The first computer 30, for example, can include one or more processors 31 and one or more barcode scanning devices 40 in communication with the one or more processors 31, as illustrated in FIG. 15, for example. The first computer 30 can also include one or more displays 32 in communication with the one or more processors 31, one or more input and output units 33 in communication with the one or more processors 31, and non-transitory memory medium 34 in communication with the one or more processors 31. For example, the first computer 30 can be a hardened server. The memory medium 34 can include computer-readable instructions stored therein that when executed cause the first computer 30 to perform steps. The computer-readable instructions can include, for example, a computer program 35. The memory medium 34 can also include temporary storage 36 and permanent storage 37. The steps performed by the first computer 30 can include, for example, decoding a first set of one or more barcodes indicative of contents of one or more validation files. The one or more barcodes can thereby define one or more validation barcodes 53, for example, which can be configured to encode contents of the one or more validation files. Decoding the one or more validation barcodes 53 can be responsive to receipt of a scan of one or more of one or more displays 12 of the second computer 10 by use of the one or more barcode scanning devices 40 of the first computer 30. Further, decoding the one or more validation barcodes 53 can produce contents of the one or more validation files represented by the one or more validation barcodes 53.

The second network 1 can be configured to have temporary storage and separate more permanent storage associated therewith. For example, temporary storage associated with the second network 1 can include temporary storage 16 of the second computer 10, for example, as illustrated in FIG. 15. More permanent storage associated with the second network 1 can include permanent storage 17 of the second computer 10, for example. In addition, the second network 1 can be further configured to have a different level of network security protection than the first network 3 and to allow only one-way secure communication from the second network 1 to the first network 3. The second computer 10, for example, can include one or more processors 11 and one or more input and output units 13 in communication with the one or more processors 11 of the second computer 10. The second computer 10 can further include one or more displays 12 in communication the one or more processors 11 of the second computer 10 and another different one or more barcode scanning devices 20 in communication with the one or more processors 11 of the second computer 10. Additionally, the second computer 10 can include non-transitory memory medium 14 in communication with the one or more processors 11 of the second computer 10. The memory medium 14 of the second computer 10 can include computer-readable instructions stored therein that when executed cause the second computer 10 to perform a series of steps. The computer-readable instructions can include, for example, a computer program 15. Further, for example, the steps can include decoding a second set of a different one or more barcodes indicative of contents of a plurality of transactional database records to thereby define one or more data barcodes 51. The plurality of transactional database records can be associated with and positioned within the first network 3. Decoding the one or more data barcodes 51 can thus produce contents of the plurality of transactional database records represented by the one or more data barcodes 51. Decoding the one or more data barcodes 51 can further be responsive to receipt of a scan of one or more of the one or more displays 32 of the first computer 30 by use of the one or more barcode scanning devices 20 of the second computer 10. The steps can also include generating the one or more validation barcodes 53 on one or more of the one or more displays 12 of the second computer 10. The one or more validation files 53 can be configured to include decoded contents of the plurality of transactional database records. As a result, generating the one or more validation barcodes 53 can thereby securely communicate decoded contents of the plurality of transactional database records in one-way communication from the temporary storage associated with the second network 1 to the first network 3 for comparison to contents of the plurality of transactional database records associated with the first network 3. The steps can further include decoding a third set of one or more different barcodes indicative of contents of one or more verification files to thereby define one or more verification barcodes 52. The one or more verification barcodes 52 can be configured to encode contents of the one or more verification files, and the one or more verification files can be configured to indicate success of transmission of contents of the plurality of transactional database records from the first network 3 to the second network 1. Decoding the one or more verification barcodes 52 can be responsive to receipt of a scan of one or more of the one or more displays 32 of the first computer 30 by use of the one or more barcode scanning devices 20 of the second computer 10. The steps can still further include storing decoded contents of the plurality of transactional database records in the more permanent storage associated with the second network 1, responsive to an indication from decoded contents of the one or more verification files of successful transmission of contents of the plurality of transactional database records associated with the first network 3 to the second network 1.

The plurality of transactional database records can be associated with one or more data historians, for example. Further, in some instances, the one or more barcode scanning devices 20 of the second computer 10 can be configured to scan a plurality of barcodes simultaneously. Likewise, the one or more barcode scanning devices 40 of the first computer 30 can be configured to scan a plurality of barcodes simultaneously.

In some circumstances, the memory medium 34 of the first computer 40 can also include computer-readable instructions stored therein that when executed cause the first computer 30 to perform additional steps, such as generating the one or more data barcodes 51 on one or more of the one or more displays 32 of the first computer 30. Additional steps performed by the first computer 30 can also include transferring decoded contents of the one or more validation files to temporary storage associated with the first network 3 after decoding the one or more validation barcodes 53. Transferring decoded contents of the one or more validation files can thereby transfer decoded contents of the plurality of transactional database records to the first network 3 for comparison to contents of the plurality of transactional database records. Other steps performed by the first computer 30 can also include generating the one or more verification barcodes 52 on one or more of the one or more displays 32 of the first computer 30, responsive to a comparison of (1) the securely communicated decoded contents of the plurality of transactional database records and (2) contents of the plurality of transactional database records positioned in the first network 3. Similarly, the memory medium 14 of the second computer 10 can further include computer-readable instructions stored therein that when executed cause the second computer 10 to perform additional steps. Additional steps performed by the second computer 10 can include, for example, transferring decoded contents of the plurality of transactional database records to temporary storage associated with the second network 1 after decoding the one or more data barcodes 51, as well as generating the one or more validation barcodes 53 on one or more of the one or more displays 12 of the second computer 10. Other steps performed by the second computer 10 can also include discarding decoded contents of the plurality of transactional database records in temporary storage associated with the second network 1, responsive to an indication from decoded contents of the one or more verification files of unsuccessful transmission of contents of the plurality of transactional database records to the second network 1.

In some circumstances, the first network 3 can be a high-security network, and the second network 1 can be a low-security network. In other circumstances, the first network 3 can be a low-security network, and the second network 1 can be a high-security network. Decoding the one or more data barcodes 51, in some instances, can include disregarding error-correction capabilities of the one or more data barcodes 51. Further, the one or more data barcodes 51, the one or more validation barcodes 53, and the one or more verification barcodes 52 can include one or more of the following: two-dimensional matrix codes, QR Codes, Aztec Codes, and PDF417 codes. A barcode scanning device can also include one or more of the following: a barcode reading device 72, a QR Code reading device, a field-of-view barcode reading device 73, and a camera.

An embodiment of the invention can additionally include non-transitory computer-readable medium having one or more computer programs stored therein operable by one or more processors to transfer data between two or more networks configured to have different levels of network protection. The one or more computer programs, for example, can include a set of instructions that, when executed by the one or more processors, cause the one or more processors to perform operations. Those operations can include decoding a first set of one or more barcodes indicative of contents of a plurality of transactional database records to thereby define one or more data barcodes 51. The plurality of transactional database records can be associated with and positioned within a first network 3. Decoding the one or more data barcodes 51 can be responsive to receipt of a scan of a display 32 of a first computer 30 in communication with and positioned within the first network 3. A scan of the display 32 of the first computer 30 can be by use of one or more barcode scanning devices 20 in communication with a second computer 10. The second computer 10 can be positioned remote from the first computer 30 and in communication with and positioned within a second network 1. Further, the second network 1 can be configured to have a different level of network security protection than the first network 3 and to allow only one-way secure communication from the second network 1 to the first network 3. Decoding the one or more data barcodes 51 can thus produce contents of the plurality of transactional database records represented by the one or more data barcodes 51.

The operations can further include decoding a second set of one or more different barcodes indicative of contents of one or more validation files to thereby define one or more validation barcodes 53. The one or more validation barcodes 53 can be configured to encode contents of the one or more validation files, and decoding the one or more validation barcodes 53 can thus produce contents of the one or more validation files represented by the one or more validation barcodes 53. The one or more validation files can be configured to include decoded contents of the plurality of transactional database records. Decoding the one or more validation barcodes 53 can be responsive to receipt of a scan of a display 12 of the second computer 10. A scan of the display 12 of the second computer 10 can be by use of a different one or more barcode scanning devices 40 in communication with the first computer 30, for example. Consequently, decoding the one or more validation barcodes 53 can thereby securely communicate decoded contents of the plurality of transactional database records in one-way communication from temporary storage associated with the second network 1 to the first network 3 for comparison to contents of the plurality of transactional database records associated with the first network 3.

The operations can also include decoding a third set of one or more different barcodes indicative of contents of one or more verification files to thereby define one or more verification barcodes 52. The one or more verification barcodes 52 can be configured to encode contents of the one or more verification files. Decoding the one or more verification barcodes 52 can thus produce contents of the one or more verification files represented by the one or more verification barcodes. Further, the one or more verification files can be configured to indicate success of transmission of contents of the plurality of transactional database records from the first network 3 to the second network 1. Decoding the one or more verification barcodes 51 can be responsive to receipt of a scan of the display 32 of the first computer 30 by use of the one or more barcode scanning devices 20 in communication with the second computer 10. The operations can then include storing decoded contents of the plurality of transactional database records in more permanent storage associated with the second network 1, responsive to an indication from decoded contents of the one or more verification files of successful transmission of contents of the plurality of transactional database records associated with the first network 3 to the second network 1.

The plurality of transactional database records can be associated with one or more data historians, for example. Further, in some instances, the one or more barcode scanning devices 20 in communication with the second computer 10 can be configured to scan a plurality of barcodes simultaneously. Likewise, the one or more barcode scanning devices 40 in communication with the first computer 30 can be configured to scan a plurality of barcodes simultaneously.

In addition, the operations can also include generating the one or more data barcodes 51 on the display 32 of the first computer 30, in some circumstances. Further, the operations can include transferring decoded contents of the plurality of transactional database records to temporary storage associated with the second network 1 after decoding the one or more data barcodes 51, as well as generating the one or more validation barcodes 53 on the display 12 of the second computer 10. The operations can still further include transferring decoded contents of the one or more validation files to temporary storage associated with the first network 3 after decoding the one or more validation barcodes 53. Transferring decoded contents of the one or more validation files can thereby transfer decoded contents of the plurality of transactional database records to the first network 3 for comparison to contents of the plurality of transactional database records. In addition, the operations can include generating the one or more verification barcodes 52 on the display 32 of the first computer 30, responsive to a comparison of (1) the securely communicated decoded contents of the plurality of transactional database records and (2) contents of the plurality of transactional database records positioned in the first network 3. Furthermore, the operations can include discarding decoded contents of the plurality of transactional database records in temporary storage associated with the second network 1, responsive to an indication from decoded contents of the one or more verification files of unsuccessful transmission of contents of the plurality of transactional database records to the second network 1.

In some circumstances, the first network 3 can be a high-security network, and the second network 1 can be a low-security network. In other circumstances, the first network 3 can be a low-security network, and the second network 1 can be a high-security network. Further, decoding the one or more data barcodes 51 can include disregarding error-correction capabilities of the one or more data barcodes 51. In some instances, the one or more data barcodes 51, the one or more validation barcodes 53, and the one or more verification barcodes 52 can include one or more of the following: two-dimensional matrix codes, QR Codes, Aztec Codes, and PDF417 codes. In addition, a barcode scanning device can include one or more of the following: a barcode reading device 72, a QR Code reading device, a field-of-view barcode reading device 73, and a camera.

In some circumstances, one of the networks can be a high-security network (HSN). An HSN can be a critical network such as, for example, a process automation system (PAS) network that requires maximum security measures and protections to ensure business continuity. One of the networks can also be a low-security network (LSN), such as a corporate business network (CBN). For example, a CBN can be a lower security network than a PAS network because, in the event that data from a network of an entity were to be lost, a data loss from the CBN would not affect the business or operations of the entity as significantly as a data loss from the PAS network. Rather, a data loss from the CBN would have a smaller impact on the entity's operations. An embodiment of the invention can therefore advantageously minimize the risk of a cybersecurity incident by eliminating the transmission of data from an LSN to an HSN through traditional networking methods.

Figure 16A:
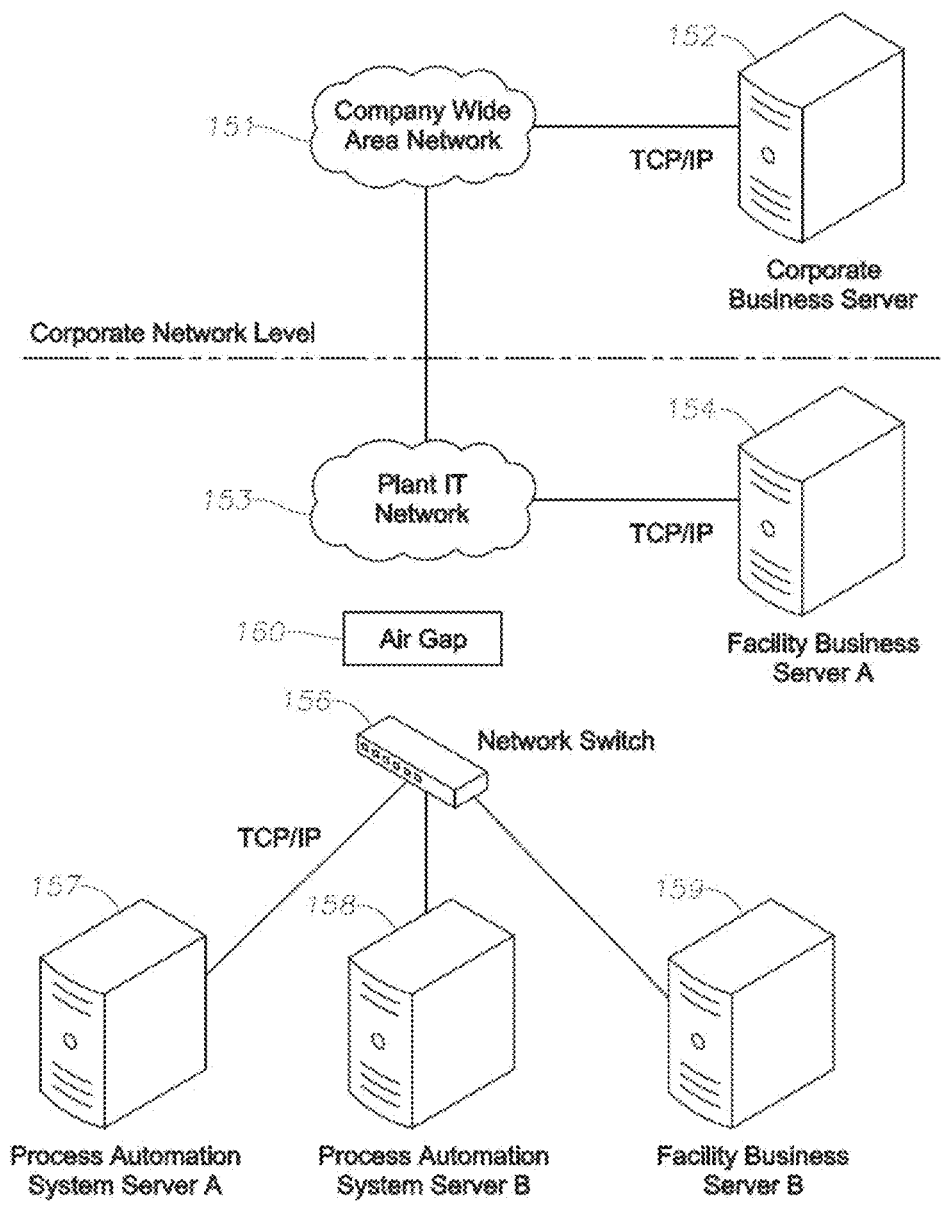
FIG. 16*a* is a schematic diagram of a system to transfer data between two or more networks configured to have different levels of network protection according to an embodiment of the invention.

An embodiment can advantageously exist and operate in arrangements that include air gaps 160 between two or more networks, as illustrated, for example, in FIG. 16*a*. In an embodiment, large volumes of data—for example, large volumes of transactional database records stored by a data historian—can be transferred between physically isolated networks by use of one or more barcode scanning devices in communication with each network. An embodiment can exist and operate, for instance, when two or more networks are physically isolated from one another. That is, an embodiment can introduce a new apparatus into an entity's equipment and infrastructure in which an air gap exists between two or more networks. An embodiment can relate to two or more networks that have no direct network connection between them—a perfect air gap—and permit transfer of data between the networks by use of barcodes. For example, an embodiment can exist and operate in arrangements in which an air gap 160 exists between two or more networks, as illustrated, for example, in FIG. 16*a* and FIG. 16*b*.

When an air gap 160 exists, no physical connection exists between two or more networks. For example, an entity that operates a manufacturing plant can have a company wide area network 151, and a corporate business server 152 can be in communication with the company wide area network 151 at a corporate network level, e.g., via TCP/IP, as illustrated in FIG. 16*a*. The company wide area network 151 can be in communication with a plant IT network 153 that is located, for example, at the entity's plant facility. The plant IT network 153 can be in communication with a first facility business server A 154, for example. A first process automation server A 157, a second process automation server B 158, and a second facility business server B 159 can also be located at the plant facility but can be separated from the plant IT network 153 and first facility business server A 154 by an air gap 160, for example. Although the first process automation server A 157, the second process automation server B 158, and the second facility business server B 159 can be in communication by use of a network switch 156, for example, they can lack TCP/IP communication with the plant IT network 153 and first facility business server A 154, as depicted in FIG. 16*a*, for example. That is, the plant IT network 153 and company wide area network 151, as depicted, cannot communicate with the process automation system servers 157 and 158 using TCP/IP protocols. An air gap 160 can be desirable to ensure that process automation system data, for example, is not subject to unauthorized access or intrusion through the plant IT network 153 or company wide area network 151.

In such an arrangement, the entity can wish to maintain the air gap 160 but nevertheless allow some communication between the process automation servers 157 and 158 and the plant IT network 153, for example. For instance, the entity can wish to transmit customer order information from the plant IT network 153 to the process automation servers 157 and 158 so as to enable the process automation servers 157 and 158 to perform some tasks to fulfill the customer order. In that instance, the entity would like to be able to transmit information securely from the plant IT network 153 to the process automation servers 157 and 158. In addition, the entity can wish to back up or otherwise transmit digitally stored information, such as transactional database records, stored in facility business server B 159, to facility business server A 154—in communication with the plant IT network 153 and on the other side of the air gap 160—for information assurance purposes. In that instance, the entity would like to be able to transmit information securely from facility business server B 159 to facility business server A 154 while maintaining the air gap 160. An embodiment of the invention can advantageously permit these transmissions while still protecting high-security networks, such as a process automation system network.

Figure 16B:
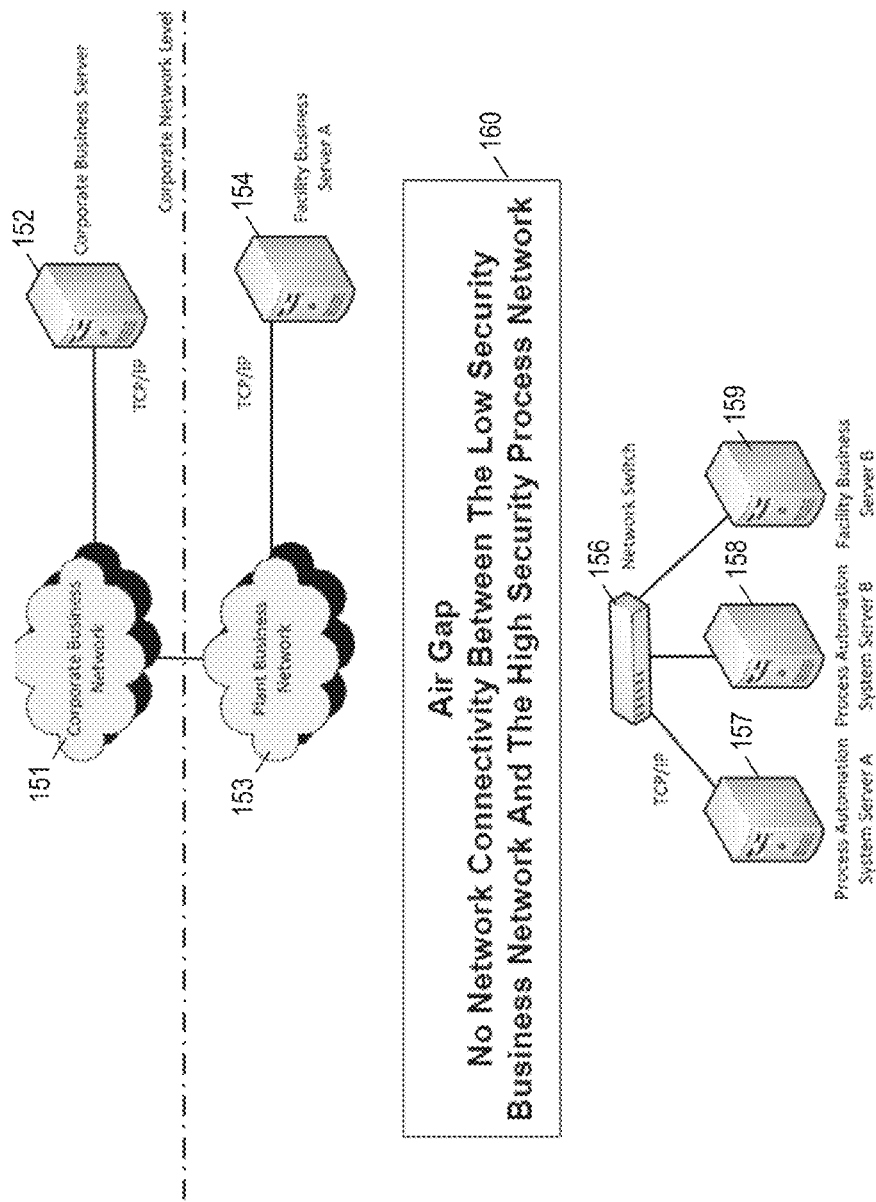
FIG. 16*b* is a schematic diagram of a system to transfer data between two or more networks configured to have different levels of network protection according to an embodiment of the invention.

As an example, a facility business server B 159 can be a first computer 30 according to an embodiment, and a facility business server A 154 can be a second computer 10, as illustrated in FIG. 16*a*. The plant IT network 153 (sometimes called a plant business network 153, as illustrated in FIG. 16*b*, for example) can be in communication with a company wide area network 151 (sometimes called a corporate business network 151, as illustrated in FIG. 16*b*, for example). In that example, the plant IT network 153, as illustrated in FIG. 16*a*, can be a second network 1 associated with facility business server A 154. A process automation system network can be a first network 3 associated with facility business server B 159. Transactional database records can be transmitted from process automation server B 158 to facility business server B 159, for example, using two-way TCP/IP communication. If any of the transactional database records are too large to be encoded in one data barcode, facility business server B 159 can partition the transactional database records into smaller files for purposes of encoding and transmission. Facility business server B 159 can then encode the plurality of transactional database records as data barcodes 51 and generate data barcodes 51 on a display. Facility business server A 154 can use a barcode scanning device to scan the display of facility business server B 159. The barcode scanning device associated with facility business server A 154 can be triggered to scan responsive to generation of the data barcodes 51 on the display of facility business server B 159. Facility business server A 154 can then decode the data barcodes 51 to produce contents of the plurality of transactional database records then store them in a temporary location. Facility business server A 154 can then generate validation barcodes 53 on a display to securely communicate decoded contents of the plurality of transactional database records to facility business server B 159. Facility business server B 159 can scan the display of facility business server A 154 then decode the validation barcodes 53 to produce decoded contents of the plurality of transactional database records. Scanning the display of facility business server A 154 can be automatically triggered by generation of the validation barcodes 53 on the display. Facility business server B 159 can then store the securely communicated decoded contents of the plurality of transactional database records in a temporary location. Facility business server B 159 can further compare the securely communicated decoded contents of the plurality of transactional database records to contents of the plurality of transactional database records. In this way, facility business server B 159 can determine whether facility business server A 154 received all of the transactional database records that were intended to be transmitted or whether an error occurred in transmission. Facility business server B 159 can then generate verification barcodes 52 on a display. Facility business server A 154 can use a barcode scanning device to scan the display of facility business server B 159. Facility business server A 154 can then decode the verification barcodes 52 to produce contents of the verification files and thereby confirm the success of the transmission of contents of the plurality of transactional database records. Advantageously, an embodiment can thus allow contents of transactional database records to be securely communicated across the air gap 160 while enabling confirmation that transmission was successful. In other examples, a facility business server A 154 can be a first computer 30 according to an embodiment, and a facility business server B 159 can be a second computer 10, as illustrated in FIG. 16*a*. Advantageously, large quantities of transactional database records can be transmitted.

Furthermore, an embodiment can thus eliminate requirements for Microsoft Windows patch management, anti-virus patch management, firewalls, intrusion prevention, data diodes, other hardware or software security devices, and two-way TCP/IP communication to transfer data between a low-security network and a high-security network. An embodiment can also eliminate risks of remote computer virus infection and remote unauthorized entry to a downstream process automation system, for example. When fewer security devices are installed on a network, energy costs can also be reduced, as can overall maintenance costs, capital investment costs, and manpower costs. An embodiment can therefore alleviate the requirements for ongoing patch management and for continuous testing and monitoring of security devices such as firewalls, intrusion prevention, and data diodes.

Specifically, benefits to an entity can include: (1) eliminating the requirements for Microsoft Windows patch management; (2) eliminating the requirements for anti-virus patch management; (3) eliminating the requirements for firewalls; (4) eliminating the requirements for intrusion prevention; (5) eliminating the requirements for data diodes; (6) eliminating the requirements for other hardware/software security devices; (7) eliminating the requirement to have two-way TCP/IP communication to transfer data between an LSN and an HSN; (8) eliminating the risk of remote unauthorized entry to a downstream process automation system; (9) eliminating the risk of remote computer virus infection; (10) reduced energy costs due to fewer security devices installed on the network when compared to data diode design; and (11) reduced overall maintenance costs due to reduced physical hardware and software installed.

In particular, an embodiment can utilize two-dimensional/QR Code multi-barcode scanning technology to transfer large volumes of transactional database records between a low-security network (LSN) and a high-security network (HSN) that are physically isolated from each other for business and operational transactions, for example. An HSN can be a critical network that requires total isolation from all other networks in a corporation, such as a process automation system (PAS) network. A corporate business network (CBN) can be considered an LSN because the criticality of a data loss would have a smaller impact on company business when compared to an HSN. Advantageously, an embodiment can eliminate any possibility of remote virus infections and unauthorized remote access from external networks to a PAS network. Implementation of an embodiment at a facility can therefore alleviate requirements for Microsoft Windows patch management and anti-virus patch management, as well as for security devices such as firewalls, intrusion prevention, and data diodes. Specifically, an embodiment can transfer large volumes of transactional database records between two physically isolated networks utilizing two-dimensional/QR Code multi-barcode scanning technology and customized processes. An embodiment can benefit businesses by installing completely isolated PAS networks from a CBN while still retaining the ability to securely pass large volumes of transactional database records from an HSN to an LSN, without the requirement to have a physical connection. An embodiment can thus eliminate the requirement to have two-way TCP/IP communication to transfer transactional database records between an HSN and an LSN.

Rather than requiring data diodes or two-way communications via TCP/IP to move large volumes of data from an LSN to an HSN—which is subject to a remote computer virus infection or breach by unauthorized persons—an embodiment of the invention can utilize two-way data transfer technology through two-dimensional/QR Code multi-barcode scanning technology to send and receive data between an HSN and an LSN. An embodiment can utilize standard hardware with a customized network design and two-dimensional/QR Code barcoding technology to move large volumes of data, such as transactional database records, back and forth between two isolated networks. Furthermore, an embodiment can eliminate a requirement for two-way communication via traditional networking methods, e.g., TCP/IP, or for custom data diodes, since data transfer between two isolated networks can be accomplished through two-dimensional/QR Code multi-barcode scanning technology. An embodiment can also eliminate the need to conduct security patch management for an HSN. Also, hardware security devices can be no longer required for an HSN since the network can be completely isolated. As a result, overall capital investment, as well as manpower costs, can be reduced significantly.

Figure 1:
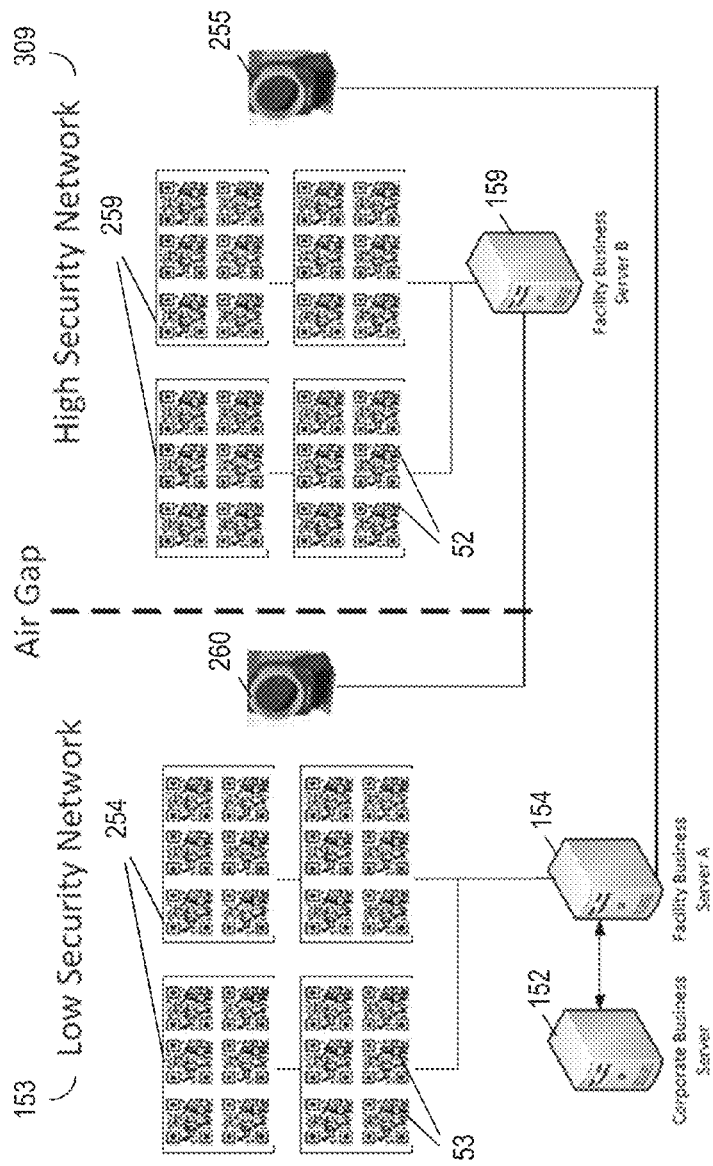
FIG. 1 is a schematic diagram of a system to transfer data between two or more networks configured to have different levels of network protection according to an embodiment of the invention.
Figure 2:
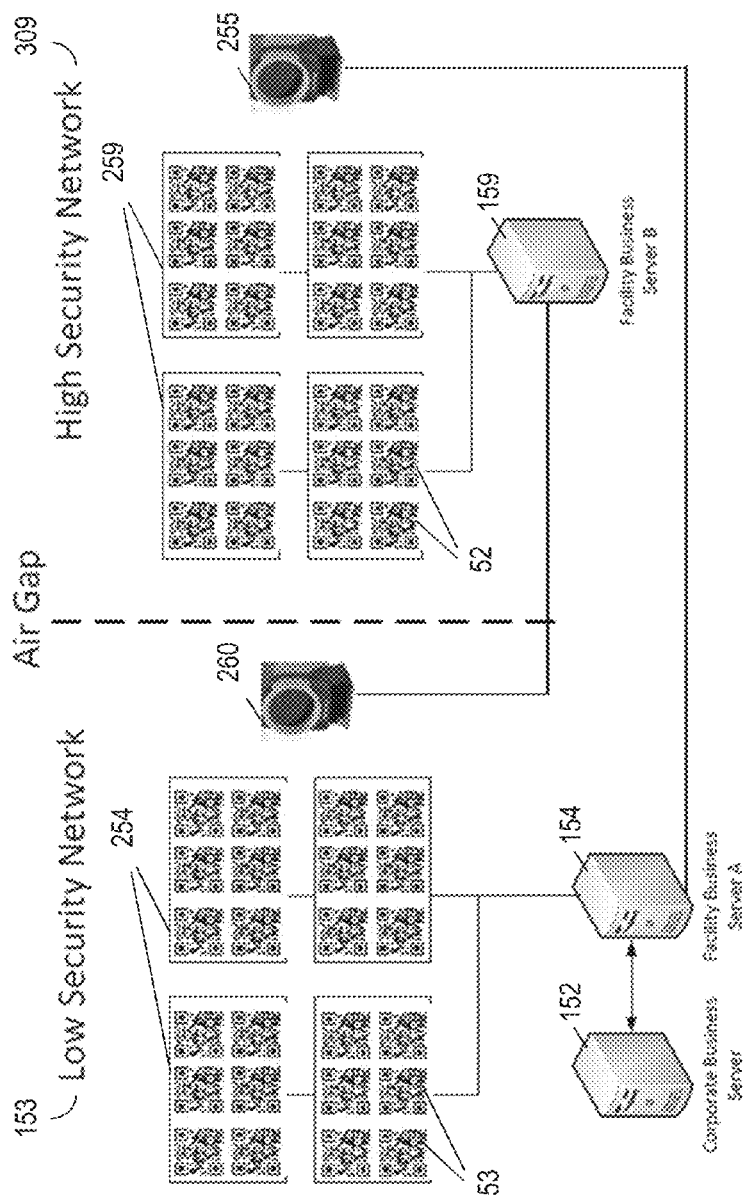
FIG. 2 is a schematic diagram of a system to transfer data between two or more networks configured to have different levels of network protection according to an embodiment of the invention.

An embodiment can therefore relate to moving large amounts of data, such as transactional database records, from an HSN to an LSN while maintaining a physical separation between these networks. An embodiment can include or be associated with two hardened servers each having one or more flat panel screens, as illustrated in FIG. 1 and FIG. 2, for example. Facility business server A 154, which can be located on an LSN such as a plant IT network 153, can have two-way communications with the corporate business server 152 on the CBN—such as the company wide area network 151 in FIG. 16a, for example. Facility business server A 154 can be located at an operating facility in the same physical room as facility business server B 159. Facility business server A 154 can also be connected to a plant business network (PBN), such as the plant IT network 153 in FIG. 16a, for example. The PBN can be physically isolated from a PAS network 309 where facility business server B 159 is connected. In other words, the CBN can have no path of communication between the HSN and the LSN. In this example, facility business server B 159 can be a first computer 30, and facility business server A 154 can be a second computer 10. Data can flow from facility business server B 159 to facility business server A 154, with data verification from facility business server A 154 to facility business server B 159 flowing through two-dimensional/QR Code multi-barcode scanning technology. This technology can provide an ability to scan multiple barcodes simultaneously. Each server can have an associated large field-of-view barcode reader 73 pointed toward its respective counterpart screen of the other server, as illustrated, for example, in FIG. 2. Facility business server B 159 can have customized software developed to generate multiple barcodes 51 simultaneously that can fill each screen 259. The large field-of-view scanner 255 of facility business server A 154 can be used to obtain all barcode data simultaneously and populate its database. Two-dimensional/QR Code multi-barcode scanner 260 can be connected to facility business server B 159. Facility business server B 159 can have customized software to scan the screen 254 of facility business server A 154 to determine if scans were successful or a rescan of any barcode is required. Once data is received by facility business server A 154, barcodes 53 can be generated and placed on the screen 254 for the barcode scanner 260 of facility business server B 159 to auto trigger the scanning process based on the new software developed for this feature. The software on facility business server B 159 can propagate a verification table in a database to compare the data collected from the process servers, such as process automation system server 157 or process automation server 158, and the data received from facility business server A 154 to thereby determine if the data was received accurately on facility business server A 154. Once this comparison is completed, facility business server B 159 can generate a two-dimensional barcode 52 that communicates successful transfer of the data. Facility business server A 154 can then store the received data and be ready for another transaction.

An embodiment as described can be particularly advantageous for transferring many transactional database records, such as, for example, a plurality of transactional database records stored by a data historian. Data historians can hold process data that is captured at specific intervals. For example, a data historian can store data that records the pressure or temperature within a piece of equipment at given time intervals such as, for example, every minute. Data can include, for example, flow control, pressure, and temperature. Consequently, data to be transferred can include a short piece of text and a number representing, for example, pressure at equipment X. This data can then be tagged, for example, with a time stamp then encoded in a barcode. That is, a transactional database record can include at least a short piece of text, a number, and a time stamp. For example, in a plant that has process automation equipment, a measuring device can sample the temperature once per second, and a data historian in communication with and part of a high-security network, such as a process automation system network, can store that measured data. An entity can wish to transfer the measured data to a low-security network, such as a corporate network, to enable analysis of the measured data. Consequently, an embodiment can relate to transferring large volumes of non-sensitive data, such as a series of continuously sampled temperature readings, to a lower security network for analysis, backup, or other purposes. Transactional database records can be transferred continuously and in real time, for example, from an HSN, such as a PAS network, to an LSN, such as a CBN.

Given that large quantities of data can be transferred, an embodiment of the invention can include barcode scanning devices that can capture many barcodes at once, such as, for example, a field-of-view barcode scanner 73. Scanning multiple barcodes at a single time makes it possible to transfer large quantities of data at a high transfer rate. For an entity that requires large data transfers, such as transfers of contents of a plurality of transactional database records from a data historian within a network to a different network, a higher speed and rate of data transfer can be particularly advantageous. In some circumstances, the rate of transfer can be equivalent to transfer of data by USB, particularly when multiple or large displays are employed. Further, scanning of a transferring computer's one or more displays can be continuous and automatic. For example, if an entity wishes to transfer contents of a plurality of transactional database records from a data historian to a different network, additional data to be transferred could always be available if the data historian is constantly storing additional data. Advantageously, no user action is required to approve data transfer in some examples of an embodiment, for example. Consequently, data can be transferred in real time as it is stored by the data historian.

Figure 3:
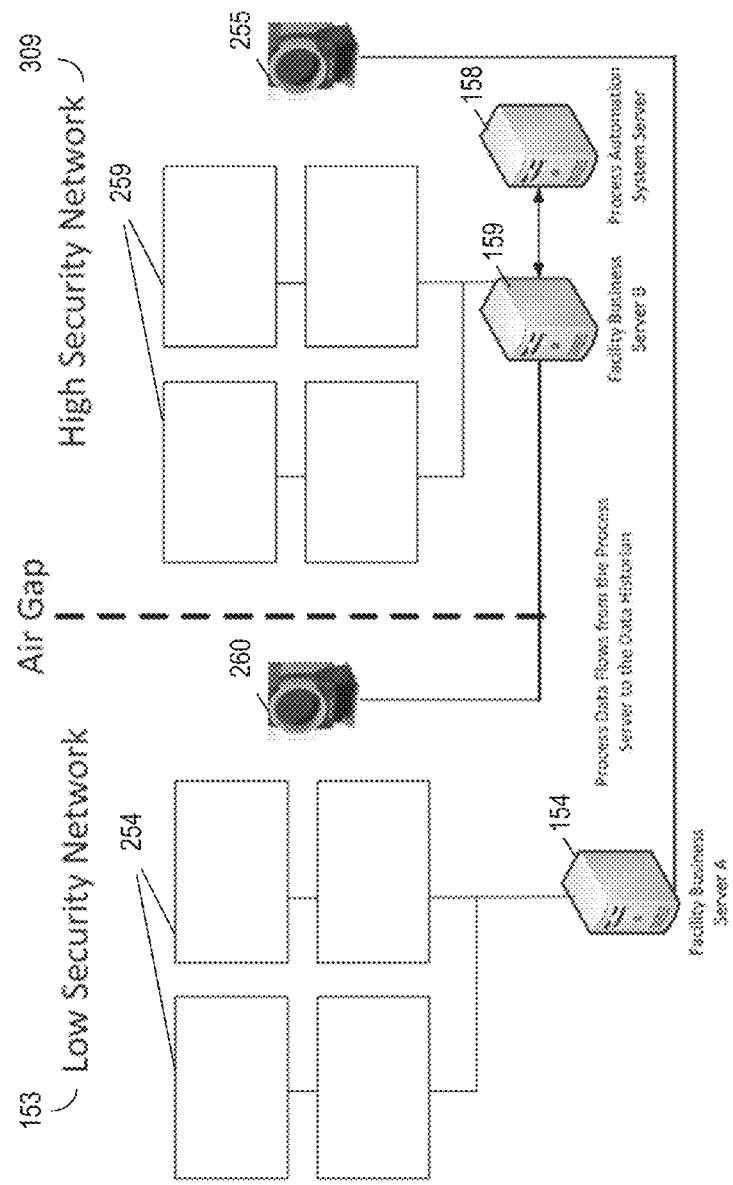
FIG. 3 is a schematic diagram of a system to transfer data between two or more networks configured to have different levels of network protection according to an embodiment of the invention.

Data, such as contents of a plurality of transactional database records, can be transferred from process automation server B 158, for example, to facility business server B 159 via two-way TCP/IP communication, as illustrated in FIG. 3, for example. In such an example, facility business server B 159 can serve as a data historian, for instance. Facility business server B 159 can then generate multiple barcodes 51 simultaneously and display the information on the screen. Barcodes 51 can be displayed, and large field barcode scanners 255 can be auto triggered by software on facility business server A 154 to capture data for archiving, as depicted in FIG. 4, for example. Facility business server A 154 can display the decoded contents of the plurality of transactional database records as barcodes 53 on its screens 254, as illustrated, for example, in FIG. 5. Facility business server B 159 can auto trigger its large field barcode scanners 260 to obtain the decoded contents of the plurality of transactional database records received on facility business server A 154 to commence a verification process. Software associated with facility business server B 159 can perform a comparison between the data sent to and received from facility business server A 154. This comparison can ensure that the data received on facility business server A 154 is correct. Facility business server B 159 can display new barcodes 52 for facility business server A 154 to scan, as illustrated, for example, in FIG. 6. If there has been a successful transfer, barcodes 52 can be encoded as a "1" for a successful transfer; otherwise, barcodes 52 can be encoded as a "0" for an unsuccessful transfer. If the transaction is successful, facility business server B 159 can write a one or zero value in a database field to indicate successful or unsuccessful data transfer and generate confirmation verification barcodes 52 for facility business server A 154 to scan. Facility business server A 154 can then store successful data transfers, i.e., decoded contents of the plurality of transactional database records, and discard unsuccessful data transfers. Facility business server A 154 and facility business server B 159 can then clear their screens and reset for a next transaction. An embodiment can be used as described to move large quantities of data back and forth from the LSN to the HSN.

More specifically, an embodiment can include a large data transfer of a plurality of transactional database records from facility business server B 159 to facility business server A 154. For example, contents of the plurality of transactional database records can be transferred from process automation system server 158 to facility business server B 159 via two-way TCP/IP communication, as illustrated, for example, in FIG. 3. Facility business server B 159 can then generate multiple barcodes 51 simultaneously and display the barcodes 51 on a screen 259, as illustrated in FIG. 4, for example. A large field barcode scanner 255 of facility business server A 154 can be auto triggered by software to scan the screen 259 of facility business server B 159. Facility business server A 154 can then store the decoded data in its database to capture decoded contents of the plurality of transactional database records from facility business server B 159. Facility business server A 154 can display the decoded contents of the plurality of transactional database records as barcodes 53 on its screens 254, as illustrated in FIG. 5, for example. Facility business server B 159 can then auto trigger its large field barcode scanners 260 to obtain the decoded contents of the plurality of transactional database records received on facility business server A 154 to commence a verification process. Facility business server B 159 can also store the verification data in a temporary database. Facility business server B 159 can further compare the data sent to and received from facility business server A 154. Facility business server B 159 can then write a one or zero value in a database field to indicate successful or unsuccessful data transfer. Facility business server B 159 can then display new barcodes 52 for successful/unsuccessful transaction, as illustrated in FIG. 6, for example. In addition, facility business server B 159 can put an unsuccessful transfer in its queue for reprocessing. The barcode scanner 255 of facility business server A 154 can be auto triggered to scan the screen 259 of facility business server B 159. Facility business server A 154 can store successful/unsuccessful, i.e., "1" and "0," data into a temporary database. Facility business server A 154 can store a successful transfer, i.e., decoded contents of the plurality of transactional database records, in its permanent database. Further, facility business server A 154 can also discard unsuccessful transfers. The screens of facility business server A 154 and facility business server B 159 can then be cleared for a next cycle.

An embodiment can also include a large data transfer of a plurality of transactional database records, for example, from facility business server A 154 to facility business server B 159. For example, transactional database records can be transferred from corporate business server 152 to facility business server A 154 via two-way TCP/IP communication, as illustrated, for example, in FIG. 2. Facility business server A 154 can generate multiple barcodes 51 simultaneously and display the barcodes 51 on a screen 254. A large field barcode scanner 260 of facility business server B 159 can be auto triggered by software to scan the screen 254 of facility business server A 154. Facility business server B 159 can then store the decoded contents of the plurality of transactional database records in its database to capture contents of the plurality of transactional database records from facility business server A 154. Facility business server B 159 can then display the decoded contents of the plurality of transactional database records as barcodes 53 on its screens 259. Facility business server A 154 can then auto trigger its large field barcode scanners 255 to obtain the decoded contents of the plurality of transactional database records received on facility business server B 159 to commence a verification process. Facility business server A 154 can then store the verification data in a temporary database. Facility business server A 154 can compare the data sent to and received from facility business server B 159. Facility business server A 154 can then write a one or zero value in a database field to indicate successful or unsuccessful data transfer. Facility business server A 154 can then display new barcodes 52 for successful/unsuccessful transaction. Facility business server A 154 can also put an unsuccessful transfer in its queue for reprocessing. The barcode scanner 260 of facility business server B 159 can then be auto triggered to scan a screen 254 of facility business server A 154. Facility business server B 159 can further store successful/unsuccessful, i.e., "1" and "0," data into a temporary database. Facility business server B 159 can also store a successful transfer, i.e., the decoded contents of the plurality of transactional database records, in its permanent database and discard unsuccessful transfers. The screens 254 and 259 of facility business server A 154 and facility business server B 159 can then be cleared for a next cycle.

An embodiment as described can provide numerous advantages. For example, an embodiment can advantageously permit transfer of contents of a plurality of transactional database records from a high-security network to a low-security network then confirm that contents of the plurality of transactional database records were transferred correctly. Additionally, an embodiment can be operated automatically, i.e., without user intervention. In some cases, barcodes alone can appear on the displays of the transferring and receiving computers, and a user cannot necessarily visually inspect barcodes alone. Further, an embodiment can include arrangements in which the first and second computer and any other equipment are stationary and unmanned. These features can be useful to transfer transactional database records more quickly when user review and approval of transactional database records to be transferred is not required. An embodiment can also eliminate the requirement to have a network connection for two-way communication between a low-security network and a high-security network that require large volumes of transactional database records to be transferred back and forth. Consequently, an embodiment can obviate any requirement for Microsoft Windows and anti-virus patch management or for security technology for the high-security network since this network can be completed isolated.

An embodiment can include utilizing on-screen two-dimensional/QR Code multi-barcode scanning technology to transfer a plurality of transactional database records between two servers located on physically isolated networks, e.g., a high-security network and a low-security network. As a result, a setup process to enable use of an embodiment can include, for example: (1) purchasing two servers; (2) purchasing eight screens; (3) purchasing a minimum of two barcode scanners; (4) developing software to convert database fields to a two-dimensional/QR Code barcode; (5) developing software to populate multiple screens with multiple barcodes; (6) developing software to automatically scan for a barcode on a computer screen and store it on another server's database; (7)

developing software to send data from one server to another for verification through barcodes; and (8) generating one or more new barcodes to confirm that data was transferred successfully.

In some circumstances, an embodiment can be associated with use of a physically secured room (sometimes described as a "clean room"). That is, an embodiment can be utilized in facilities that have restricted-access rooms that are locked and secure to house, for example, servers associated with a high-security network. Persons with restricted access can, in some circumstances, perform data transfers between a high-security network and a low-security network within a physically secured room according to embodiments of the invention. Those authorized persons can include, for example, engineers or operations personnel. Anyone entering the room can be required to check any removable media or other items before entering the room. An embodiment can enable a control engineer, for example, to be frisked prior to entering a control room associated with the high-security network to perform the engineer's maintenance duties related to the network. An entity could choose to establish a physically secured room to minimize the risk of unauthorized data removal from—or unauthorized additions or changes to—a network by use of removable media. Consequently, use of a physically secured room in conjunction with an embodiment of the invention can further minimize the vulnerability of a high-security network while still allowing bidirectional data transmission.

In some circumstances, for example, a physically secured room can contain one or more displays 32 of a first computer 30 and one or more barcode scanning devices 40 in communication with the first computer 30, as illustrated, for example, in FIG. 11. The physically secured room can further contain one or more displays 12 of a second computer 10 and one or more barcode scanning devices 20 in communication with the second computer 10. The one or more barcode scanning devices 20 in communication with the second computer 10 can be positioned so as to establish a line of sight 400 that includes one or more of the one or more displays 32 of the first computer 30, as illustrated, for example, in FIG. 12. The one or more barcode scanning devices 20 and the one or more displays 32 can further be mounted so as to render them immobile and ensure that the line of sight 400 between them is maintained. Similarly, the one or more barcode scanning devices 40 in communication with the first computer 30 can be positioned so as to establish a line of sight 400 that includes one or more of the one or more displays 12 of the second computer 10, as illustrated in FIG. 12, for example. The one or more barcode scanning devices 40 and the one or more displays 12 can further be mounted so as to render them immobile and ensure that the line of sight 400 between them is maintained.

The one or more displays 12, the one or more displays 32, the one or more barcode scanning devices 20, and the one or more barcode scanning devices 40 can be stationary and fixed so as to ensure that line of sight 400 remains unimpeded to allow data transmission according to embodiments of the invention. Consequently, in such circumstances, transactional database records can be transmitted between the first network 3 and the second network 1 without any need for user review or approval of transactional database records to be transferred after a data transfer process has been initiated. A user or other person may, however, also manually initiate, approve, or supervise data transfers from within the physically secured room.

More generally, an embodiment can include, for example, computer-implemented methods to transfer data between two or more networks having different levels of network protection. Data to be transferred can be one or more types of digitally stored information, including, for example, data files, transactional database records, transactional data, and data backup files. A method according to an embodiment can include generating one or more data barcodes 51 on a display 32 of a first computer 30 in communication with and positioned within a first network 3, for example. The one or more data barcodes 51 can be configured to encode one or more pieces of digitally stored information positioned in the first network 3. For example, a data barcode 51 can encode digitally stored information including transactional data, such as information illustrated on the display 32 along with the data barcode 51. For example, the one or more pieces of digitally stored information can encode a set of data including a plurality of database field data of any database field types used for transactional data, such as numeric and text data. For instance, the one or more pieces of digitally stored information can encode a set of data including data, for example, in Database Fields 1-6. An exemplary set of data in Database Fields 1-6, for example, can include one or more values in each database field. For instance, Database Field 1 can have a value of 123459, Database Field 2 can have a value of 10412, Database Field 3 can have a value of 123456, Database Field 4 can have a value of XXX, Database Field 5 can have a value of 40,000, and Database Field 6 can have a value of 1. As another example, the one or more pieces of digitally stored information can encode a set of data relating to a product order and including, for instance, a customer order number, a driver identification number, a customer number, a product identifier, a measure of quantity, and a measure of units. That is, in such an example, Database Field 1 can relate to customer order number, Database Field 2 can relate to driver identification number, Database Field 3 can relate to customer identifiers, Database Field 4 can relate to product identifiers, Database Field 5 can relate measures of quantity, and Database Field 6 can relate to measures of units, for example. Furthermore, more than one data barcode 51 can encode pieces of digitally stored information, as illustrated in FIG. 14, for example. A method can further include decoding the one or more data barcodes 51 responsive to scanning the display 32 by use of one or more barcode scanning devices 20 in communication with a second computer 10. The second computer 10 can be positioned remote from the first computer 30 and in communication with and positioned within a second network 1, as illustrated in FIG. 15, for example. The second network 1 can have a different level of network security protection than the first network 3 and be configured for only one-way secure communication from the second network 1 to the first network 3. A method can also include transferring the one or more decoded pieces of digitally stored information to temporary storage associated with the second network 1. For example, after scanning the display 32 by use of a barcode scanning device 20, as illustrated in FIG. 14, for example, the one or more data barcodes 51 can be decoded, and the one or more decoded pieces of digitally stored information can be transferred to temporary storage associated with the second network 1. For example, information related to the data from Database Fields 1-6 can be encoded in a data barcode 51 and can be decoded and transferred to temporary storage. The information can also be displayed on a display 12 of the second computer 10, for example. A method can further include securely communicating copies of the one or more decoded pieces of digitally stored information in one-way direction from the second computer 10 to the first computer 30.

A method can also include generating—responsive to comparison of the securely communicated copies of the one or more decoded pieces of digitally stored information and the one or more pieces of digitally stored information positioned in the first network 3—one or more verification barcodes 52 on the display 32 of the first computer 30, for example. Comparison of the securely communicated copies of the one or more decoded pieces of digitally stored information and the one or more pieces of digitally stored information positioned in the first network 3 can include comparison by use of a verification table in a database, for example. The one or more verification barcodes 52 can be configured to encode one or more verification files to indicate success of a data transmission from the first network 3 to the second network 1. For example, a verification barcode 52 can encode one or more verification files indicating a successful transmission, and the display 32 of the first computer 30 can display text indicating successful transmission. A method can further include decoding—responsive to scanning the display 32 of the first computer 30 by use of the one or more barcode scanning devices 20 in communication with the second computer 10—the one or more verification barcodes 52. Decoding the one or more verification barcodes 52 can thereby confirm success of a data transmission from the first network 3 to the second network 1, for example. After decoding the one or more verification barcodes 52, a display 12 of the second computer 10 can display the same information (e.g., that Database Field 1 has a value of 123459, Database Field 2 has a value of 10412, Database Field 3 has a value of 123456, Database Field 4 has a value of XXX, Database Field 5 has a value of 40,000, Database Field 6 has a value of 1, and that transmission was successful), including successfulness of data transmission, as the display 32 of the first computer 30, for example. Successfulness of data transmission can be indicated by, for example, a numeral "one" for successful and a numeral "zero" for unsuccessful. A method can also include storing, responsive to an indication in the one or more verification files of successful data transmission of the one or more pieces of digitally stored information, the one or more pieces of digitally stored information in permanent storage associated with the second network 1. A method according to an embodiment can further include discarding the one or more pieces of digitally stored information in temporary storage associated with the second network 1, responsive to an indication in the one or more verification files of unsuccessful data transmission of the one or more pieces of digitally stored information. Additionally, decoding the one or more data barcodes 51 according to an embodiment can include disregarding error-correction capabilities of the one or more data barcodes 51.

In some methods to transfer data between two or more networks having different levels of network protection according to an embodiment of the invention, a method can include decoding one or more data barcodes 51. Decoding the one or more data barcodes 51 can be responsive to scanning from a display 32 of a first computer 30 in communication with and positioned within a first network 3 by use of one or more barcode scanning devices 20 in communication with a second computer 10. The second computer 10 can be positioned remote from the first computer 30 and in communication with and positioned within a second network 1. Decoding the one or more data barcodes 51 can also produce contents of one or more pieces of digitally stored information represented by the one or more data barcodes 51 and associated with the first network 3. The second network 1 can have a different level of network security protection than the first network 3 and can be configured for only one-way secure communication from the second network 1 to the first network 3. A method can further include securely communicating copies of contents of the one or more decoded pieces of digitally stored information in one-way communication from temporary storage associated with the second network 1 to the first network 3 for comparison to the one or more pieces of digitally stored information associated with the first network 3. Temporary storage associated with the second network 1 can include, for example, temporary storage 16 of the second computer 10, as illustrated, for example, in FIG. 15. A method can further include decoding, responsive to scanning the display 32 of the first computer 30 by use of the one or more barcode scanning devices 20 in communication with the second computer 10, one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. A method can further include storing contents of the one or more decoded pieces of digitally stored information in more permanent storage associated with the second network 1, responsive to an indication from contents of the one or more verification files of successful data transmission of the one or more pieces of digitally stored information associated with the first network 3 to the second network 1. More permanent storage associated with the second network 1 can include, for example, permanent storage 17 of the second computer 10, as illustrated, for example, in FIG. 15. Decoding one or more data barcodes 51 according to an embodiment can include disregarding error-correction capabilities of the one or more data barcodes 51. In addition, a method according to an embodiment can further include discarding the one or more decoded pieces of digitally stored information, responsive to an indication from contents of the one or more verification files of unsuccessful data transmission of the one or more pieces of digitally stored information.

In some circumstances, for example, the first network 3 can be a high-security network, and the second network 1 can be a low-security network. In other circumstances, the first network 3 can be a low-security network, and the second network 1 can be a high-security network. Notably, as will be understood by those skilled in the art, the one or more data barcodes 51 and the one or more verification barcodes 52 can be one or more of the following: two-dimensional matrix codes, QR Codes, Aztec Codes, and PDF417 codes. Validation barcodes 53 can likewise be two-dimensional matrix codes, such as, for example, QR Codes or Aztec Codes, or PDF417 codes, for example. As will be understood by those skilled in the art, a barcode scanning device, such as a barcode scanning device 20 or a barcode scanning device 40, can include one or more of the following: a barcode reading device 72, a QR Code reading device, a field-of-view barcode reading device 73, and a camera, as illustrated, for example, in FIG. 10*a* and FIG. 10*b*. In FIG. 10*a*, a computer 70 is connected to a display 71 and a barcode reading device 72. Similarly, in FIG. 10*b*, a computer 70 is connected to a field-of-view barcode reading device 73, in addition to a display 71. A barcode scanning device 20 or a barcode scanning device 40 can have the ability to scan more than one barcode simultaneously.

For instance, in some computer-implemented methods according to an embodiment of the invention, securely communicating copies of the one or more decoded pieces of digitally stored information in one-way direction from the second computer 10 to the first computer 30 can include generating, on a display 12 of the second computer 10, one or more validation barcodes 53. The one or more validation barcodes 53 can be configured to encode copies of the one or more decoded pieces of digitally stored information in temporary storage associated with the second network 1. Securely communicating copies of the one or more decoded pieces of digitally stored information in one-way direction from the second computer 10 to the first computer 30 can further include decoding the one or more validation barcodes 53 responsive to scanning the display 12 of the second computer 10 by use of one or more other barcode scanning devices 40 in communication with the first computer 30. The one or more other barcode scanning devices 40 can be different than the one or more barcode scanning devices 20. Securely communicating copies of the one or more decoded pieces of digitally stored information in one-way direction from the second computer 10 to the first computer 30 can then include transferring the decoded copies of the one or more decoded pieces of digitally stored information to storage associated with the first network 3. For example, storage associated with the first network 3 can include temporary storage 36 or permanent storage 37 of the first computer 30, as illustrated in FIG. 15. Further, the one or more pieces of digitally stored information can include a plurality of transactional database records. The one or more barcode scanning devices 20 in communication with the second computer 10 and the one or more other barcode scanning devices 40 in communication with the first computer 30 can also be configured to scan a plurality of barcodes simultaneously. The plurality of transactional database records can be associated with one or more data historians, as well.

Additionally, in some methods according to an embodiment, securely communicating copies of contents of the one or more decoded pieces of digitally stored information in one-way communication from temporary storage associated with the second network 1 to the first network 3 can include decoding one or more validation barcodes 53, responsive to scanning from a display 12 of the second computer 10 by use of one or more other barcode scanning devices 40 in communication with the first computer 30. The one or more validation barcodes 53 can be configured to encode one or more copies of contents of the one or more decoded pieces of digitally stored information. Further, contents of the one or more pieces of digitally stored information can include a plurality of transactional database records. The one or more barcode scanning devices 20 in communication with the second computer 10 and the different one or more barcode scanning devices 40 in communication with the first computer 30 can also be configured to scan a plurality of barcodes simultaneously. The plurality of transactional database records can be associated with one or more data historians, as well.

An embodiment can also include systems to transfer data between two or more networks having different levels of network protection. A system according to an embodiment can include a first computer 30 in communication with and positioned within a first network 3. The first computer 30 can include one or more processors 31 and one or more input and output units 33 in communication with the one or more processors 31. The first computer 30 can further include one or more displays 32 in communication with the one or more processors 31 and non-transitory memory medium 34 in communication with the one or more processors 31. For example, the first computer 30 can be a hardened server. The memory medium 34 can include computer-readable instructions stored therein that when executed cause the first computer 30 to perform steps. The computer-readable instructions can include, for example, a computer program 35, as illustrated in FIG. 15, for example. The memory medium 34 can also include temporary storage 36 and permanent storage 37. Steps performed by the first computer 30 can include generating one or more data barcodes 51 on one or more of the one or more displays 32 of the first computer 30. The one or more data barcodes 51 can be configured to encode one or more pieces of digitally stored information positioned in the first network 3. Steps performed by the first computer 30 can further include generating—responsive to comparison of the one or more pieces of digitally stored information positioned in the first network 3 and copies of the one or more pieces of digitally stored information securely communicated from a second network 1—one or more verification barcodes 52 on one or more of the one or more displays 32 of the first computer 30. The one or more verification barcodes 52 can be configured to encode one or more verification files to indicate success of a data transmission from the first network 3 to the second network 1. A system can further include a second computer 10 positioned remote from the first computer 30 and in communication with and positioned within the second network 1. The second network 1 can have temporary storage and separate permanent storage associated therewith. For example, temporary storage associated with the second network 1 can include temporary storage 16 of the second computer 10, for example, as illustrated in FIG. 15. Permanent storage associated with the second network 1 can include permanent storage 17 of the second computer 10, for example. The second network 1 can have a different level of network security protection than the first network 3 and can be configured for only one-way secure communication from the second network 1 to the first network 3. The second computer 10 can include one or more processors 11 and one or more input and output units 13 in communication with the one or more processors 11 of the second computer 10. The second computer 10 can further include one or more barcode scanning devices 20 in communication with the one or more processors 11 of the second computer 10 and positioned to enable scanning of the one or more displays 32 of the first computer 30. The second computer 10 can also include non-transitory memory medium 14 in communication with the one or more processors 11 of the second computer 10. For example, the second computer 10 can be a hardened server. The memory medium 14 can include computer-readable instructions stored therein that when executed cause the second computer 10 to perform steps.

Steps performed by the second computer 10 can include decoding the one or more data barcodes 51, responsive to scanning the one or more of the one or more displays 32 of the first computer 30 by use of the one or more barcode scanning devices 20. Scanning the one or more of the one or more displays 32 according to an embodiment can be automatically triggered by generation of one or more data barcodes 51 on one or more of the one or more displays 32. Steps performed by the second computer 10 can further include transferring the one or more decoded pieces of digitally stored information to the temporary storage associated with the second network 1. Steps performed by the second computer 10 can also include securely communicating copies of the one or more decoded pieces of digitally stored information in one-way direction from the second computer 10 to the first computer 30. Steps performed by the second computer 10 can then include decoding, responsive to scanning the one or more of the one or more displays 32 of the first computer 30 by use of the one or more barcode scanning devices 20, the one or more verification barcodes 52. Decoding the one or more verification barcodes 52 can thereby confirm success of a data transmission from the first network 3 to the second network 1. Steps performed by the second computer 10 can further include storing the one or more pieces of digitally stored information in the permanent storage associated with the second network 1, responsive to an indication in the one or more verification files of successful data transmission of the one or more pieces of digitally stored information. Further, one or more of the one or more displays 32 can be cleared after steps have been performed, for example. In addition, the memory medium 14 of the second computer 10 can further include computer-readable instructions stored therein that when executed cause the second computer 10 to perform the step of discarding the one or more pieces of digitally stored information in the temporary storage associated with the second network 1, responsive to an indication in the one or more verification files of unsuccessful data transmission of the one or more pieces of digitally stored information.

In some systems to transfer data between two or more networks having different levels of network protection according to an embodiment of the invention, a system can include a first computer 30 in communication with and positioned within a first network 3 and a second computer 10 positioned remote from the first computer 30 and in communication with and positioned within a second network 1. The first computer 30 can include one or more processors 31 and one or more displays 32 in communication with the one or more processors 31. In addition, the second network 1 can have temporary storage and separate more permanent storage associated therewith. For example, temporary storage associated with the second network 1 can include temporary storage 16 of the second computer 10, for example, as illustrated in FIG. 15. Permanent storage associated with the second network 1 can include permanent storage 17 of the second computer 10, for example. The second network 1 can also have a different level of network security protection than the first network 3 and can be configured for only one-way secure communication from the second network 1 to the first network 3. The second computer 10 can include one or more processors 11 and one or more input and output units 13 in communication with the one or more processors 11. The second computer 10 can also include one or more barcode scanning devices 20 in communication with the one or more processors 11 and non-transitory memory medium 14 in communication with the one or more processors 11. The memory medium 14 can include computer-readable instructions stored therein that when executed cause the second computer 10 to perform steps.

Steps performed by the second computer 10 can include decoding one or more data barcodes 51, responsive to scanning from one or more of the one or more displays 32 of the first computer 30 by use of the one or more barcode scanning devices 20. Decoding the one or more data barcodes 51 can produce contents of one or more pieces of digitally stored information represented by the one or more data barcodes 51 and associated with the first network 3. Steps performed by the second computer 10 can further include securely communicating copies of contents of the one or more decoded pieces of digitally stored information in one-way communication from the temporary storage associated with the second network 1 to the first network 3 for comparison to the one or more pieces of digitally stored information associated with the first network 3. Steps performed by the second computer 10 can also include decoding—responsive to scanning one or more of the one or more displays 32 of the first computer 30 by use of the one or more barcode scanning devices 20—one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. Steps performed by the second computer 10 can further include storing contents of the one or more decoded pieces of digitally stored information in the more permanent storage associated with the second network 1, responsive to an indication from contents of the one or more verification files of successful data transmission of the one or more pieces of digitally stored information associated with the first network 3 to the second network 1. The memory medium 14 can further include computer-readable instructions stored therein that when executed cause the second computer 10 to perform the step of discarding the one or more decoded pieces of digitally stored information, responsive to an indication from contents of the one or more verification files of unsuccessful data transmission of the one or more pieces of digitally stored information.

An embodiment related to use of one or more second barcode scanning devices can also include systems. In some systems according to an embodiment of the invention, the first network 3 can have storage associated therewith. In addition, the first computer 30 can further include one or more other barcode scanning devices 40 in communication with the one or more processors 31 of the first computer 30, as illustrated, for example, in FIG. 15. For example, storage associated with the first network 3 can include temporary storage 36 or permanent storage 37 of the first computer 30. The second computer 10 can further include one or more displays 12 in communication with the one or more processors 11 of the second computer 10. The one or more displays 12 can also be positioned to enable scanning thereof by the one or more other barcode scanning devices 40 of the first computer 30, as illustrated, for example, in FIG. 14. In FIG. 14, an air gap AG exists between the first computer 30 and the second computer 10. The first computer 30 and the second computer 10 can be in the same physical room. Securely communicating copies of the one or more decoded pieces of digitally stored information in one-way direction from the second computer 10 to the first computer 30 can include generating, on one or more of the one or more displays 12 of the second computer 10, one or more validation barcodes 53. The one or more validation barcodes 53 can be configured to encode copies of the one or more decoded pieces of digitally stored information in the temporary storage associated with the second network 1. The memory medium 34 of the first computer 30 can further include computer-readable instructions stored therein that when executed cause the first computer 30 to perform the steps of decoding the one or more validation barcodes 53 responsive to scanning the one or more of the one or more displays 12 of the second computer 10 by use of the one or more other barcode scanning devices 40 of the first computer 30 and transferring the decoded copies of the one or more decoded pieces of digitally stored information to the storage associated with the first network 3. Further, the one or more pieces of digitally stored information can include a plurality of transactional database records. The one or more barcode scanning devices 20 of the second computer 10 and the one or more other barcode scanning devices 40 of the first computer 30 can also be configured to scan a plurality of barcodes simultaneously. The plurality of transactional database records can be associated with one or more data historians, as well.

In addition, in some systems according to an embodiment of the invention, the first computer 30 can further include one or more other barcode scanning devices 40 in communication with the one or more processors 31 of the first computer 30, as illustrated, for example, in FIG. 15. The second computer 10 can further include one or more displays 12 in communication with the one or more processors 11 of the second computer 10. The one or more displays 12 can also be positioned to enable scanning thereof by the one or more other barcode scanning devices 40 of the first computer 30. Securely communicating copies of contents of the one or more decoded pieces of digitally stored information in one-way communication from the temporary storage associated with the second network 1 to the first network 3 can include generating, on one or more of the one or more displays 12 of the second computer 10, one or more validation barcodes 53. The one or more validation barcodes 53 can be configured to encode copies of contents of the one or more decoded pieces of digitally stored information. Generating the one or more validation barcodes 53 on one or more of the one or more displays 12 of the second computer 10 can thereby enable scanning of the one or more of the one or more displays 12 of the second computer 10 by the one or more other barcode scanning devices 40 of the first computer 30. Further, contents of the one or more pieces of digitally stored information can include a plurality of transactional database records. The one or more barcode scanning devices 20 of the second computer 10 and the one or more other barcode scanning devices 40 of the first computer 30 can also be configured to scan a plurality of barcodes simultaneously. The plurality of transactional database records can be associated with one or more data historians, as well.

An embodiment can also include non-transitory computer-readable medium having one or more computer programs stored therein operable by one or more processors to transfer data between two or more networks having different levels of network protection. The one or more computer programs can include a set of instructions that, when executed by the one or more processors, cause the one or more processors to perform operations. Operations can include generating one or more data barcodes 51 on a display 32 of a first computer 30 in communication with and positioned within a first network 3. The one or more data barcodes 51 can be configured to encode one or more pieces of digitally stored information positioned in the first network 3. Operations can further include decoding the one or more data barcodes 51 responsive to scanning the display 32 by use of one or more barcode scanning devices 20 in communication with a second computer 10. The second computer 10 can be positioned remote from the first computer 30 and in communication with and positioned within a second network 1. The second network 1 can have a different level of network security protection than the first network 3 and can be configured for only one-way secure communication from the second network 1 to the first network 3. Operations can also include transferring the one or more decoded pieces of digitally stored information to temporary storage associated with the second network 1. Operations can further include securely communicating copies of the one or more decoded pieces of digitally stored information in one-way direction from the second computer 10 to the first computer 30. Operations can also include generating one or more verification barcodes 52 on the display 32 of the first computer 30, responsive to comparison of the securely communicated copies of the one or more decoded pieces of digitally stored information and the one or more pieces of digitally stored information positioned in the first network 3. The one or more verification barcodes 52 can be configured to encode one or more verification files to indicate success of a data transmission from the first network 3 to the second network 1. Operations can further include decoding the one or more verification barcodes 52, responsive to scanning the display 32 of the first computer 30 by use of the one or more barcode scanning devices 20 in communication with the second computer 10. Decoding the one or more verification barcodes 52 can thereby confirm success of a data transmission from the first network 3 to the second network 1. Operations can also include storing the one or more pieces of digitally stored information in permanent storage associated with the second network 1, responsive to an indication in the one or more verification files of successful data transmission of the one or more pieces of digitally stored information. The set of instructions, when executed by the one or more processors, can further cause the one or more processors to perform the operation of discarding, responsive to an indication in the one or more verification files of unsuccessful data transmission of the one or more pieces of digitally stored information, the one or more pieces of digitally stored information in temporary storage associated with the second network 1.

An embodiment can also include non-transitory computer-readable medium having one or more computer programs stored therein operable by one or more processors to transfer data between two or more networks having different levels of network protection. For example, the one or more computer programs can include a set of instructions that, when executed by the one or more processors, cause the one or more processors to perform operations. Operations can include decoding one or more data barcodes 51, responsive to scanning from a display 32 of a first computer 30 in communication with and positioned within a first network 3 by use of one or more barcode scanning devices 20 in communication with a second computer 10. The second computer 10 can be positioned remote from the first computer 30 and in communication with and positioned within a second network 1. Decoding one or more data barcodes 51 can produce contents of one or more pieces of digitally stored information represented by the one or more data barcodes 51 and associated with the first network 3. The second network 1 can have a different level of network security protection than the first network 3 and be configured for only one-way secure communication from the second network 1 to the first network 3. For example, non-transitory computer-readable medium can be memory 14 of the second computer having one or more computer programs 15 stored therein, as illustrated in FIG. 15, for example. Operations can further include securely communicating copies of contents of the one or more decoded pieces of digitally stored information in one-way communication from temporary storage associated with the second network 1 to the first network 3 for comparison to the one or more pieces of digitally stored information associated with the first network 3. Operations can also include decoding—responsive to scanning the display 32 of the first computer by use of the one or more barcode scanning devices 20 in communication with the second computer 10—one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. Operations can further include storing contents of the one or more decoded pieces of digitally stored information in more permanent storage associated with the second network 1, responsive to an indication from contents of the one or more verification files of successful data transmission of the one or more pieces of digitally stored information associated with the first network 3 to the second network 1. The set of instructions, when executed by the one or more processors, can further cause the one or more processors to perform the operation of discarding the one or more decoded pieces of digitally stored information, responsive to an indication from contents of the one or more verification files of unsuccessful data transmission of the one or more pieces of digitally stored information.

An embodiment can also include non-transitory computer-readable medium having one or more computer programs stored therein. In some non-transitory computer-readable medium having one or more computer programs stored therein according to an embodiment of the invention, securely communicating copies of the one or more decoded pieces of digitally stored information in one-way direction from the second computer 10 to the first computer 30 can include generating, on a display 12 of the second computer 10, one or more validation barcodes 53. The one or more validation barcodes 53 can be configured to encode copies of the one or more decoded pieces of digitally stored information in temporary storage associated with the second network 1. Securely communicating copies of the one or more decoded pieces of digitally stored information in one-way direction from the second computer 10 to the first computer 30 can also include decoding the one or more validation barcodes 53 responsive to scanning the display 12 of the second computer 10 by use of one or more other barcode scanning devices 40 in communication with the first computer 30. Further, the one or more pieces of digitally stored information can include a plurality of transactional database records. The one or more barcode scanning devices 20 in communication with the second computer 10 and the one or more other barcode scanning devices 40 in communication with the first computer 30 can also be configured to scan a plurality of barcodes simultaneously. The plurality of transactional database records can be associated with one or more data historians, as well. Securely communicating copies of the one or more decoded pieces of digitally stored information in one-way direction from the second computer 10 to the first computer 30 can also include transferring the decoded copies of the one or more decoded pieces of digitally stored information to storage associated with the first network 3. Additionally, in some circumstances, securely communicating copies of contents of the one or more decoded pieces of digitally stored information in one-way communication from temporary storage associated with the second network 1 to the first network 3 can include decoding one or more validation barcodes 53, responsive to scanning from a display 12 of the second computer 10 by use of one or more other barcode scanning devices 40 in communication with the first computer 30. In such circumstances, the one or more validation barcodes 53 can be configured to encode one or more copies of contents of the one or more decoded pieces of digitally stored information. Further, the one or more pieces of digitally stored information can include a plurality of transactional database records. The one or more barcode scanning devices 20 in communication with the second computer 10 and the different one or more barcode scanning devices 40 in communication with the first computer 30 can also be configured to scan a plurality of barcodes simultaneously. The plurality of transactional database records can be associated with one or more data historians, as well.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

This application relates to, claims priority to and the benefit of, and incorporates by reference herein U.S. Provisional Patent Application No. 61/954,237, titled "Systems, Methods, and Computer Medium to Securely Transfer Data Between Networks Having Different Levels of Network Protection" and filed on Mar. 17, 2014. This application further relates to, claims priority to and the benefit of, and incorporates by reference herein U.S. Non-Provisional patent application Ser No. 14/336,154, titled "Systems, Methods, and Computer Medium to Securely Transfer Business Transactional Data Between Networks Having Different Levels of Network Protection Using Barcode Technology with Data Diode Network Security Appliance" and filed the same day, Jul. 21, 2014, and concurrently herewith; U.S. Non-Provisional patent application Ser No. 4/336,395, titled "Systems, Methods, and Computer Medium to Securely Transfer Business Transactional Data Between Physically Isolated Networks Having Different Levels of Network Protection Utilizing Barcode Technology" and filed the same day, Jul. 21, 2014, and concurrently herewith; and U.S. Non-Provisional patent application Ser No. 14/336442, titled "Systems, Methods, and Computer Medium to Securely Transfer Backup Data Between Physically Isolated Networks Having Different Levels of Network Protection" and filed the same day, Jul. 21, 2014, and concurrently herewith.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

That claimed is:

1. A computer-implemented method to transfer data between two or more networks configured to have different levels of network protection, the method comprising:
   decoding a first set of one or more barcodes indicative of contents of a plurality of transactional database records associated with and positioned within a first network to thereby define one or more data barcodes, responsive to receipt of a scan of a display of a first computer in communication with and positioned within the first network, by use of one or more barcode scanning devices in communication with a second computer positioned remote from the first computer and in communication with and positioned within a second network, to produce contents of the plurality of transactional database records represented by the one or more data barcodes, the second network configured to have a different level of network security protection than the first network and configured to allow only one-way secure communication from the second network to the first network;
   decoding a second set of one or more different barcodes indicative of contents of one or more validation files to thereby define one or more validation barcodes, responsive to receipt of a scan of a display of the second computer, by use of a different one or more barcode scanning devices in communication with the first computer, to produce contents of the one or more validation files represented by the one or more validation barcodes, the one or more validation barcodes configured to encode contents of the one or more validation files, the one or more validation files configured to include decoded contents of the plurality of transactional database records, to thereby securely communicate decoded contents of the plurality of transactional database records in one-way communication from temporary storage associated with the second network to the first network for comparison to contents of the plurality of transactional database records associated with the first network;
   decoding a third set of one or more different barcodes indicative of contents of one or more verification files to thereby define one or more verification barcodes, responsive to receipt of a scan of the display of the first computer by use of the one or more barcode scanning devices in communication with the second computer, to produce contents of the one or more verification files represented by the one or more verification barcodes, the one or more verification barcodes configured to encode contents of the one or more verification files, the one or more verification files configured to indicate success of transmission of contents of the plurality of transactional database records from the first network to the second network; and
   storing decoded contents of the plurality of transactional database records in more permanent storage associated with the second network responsive to an indication from decoded contents of the one or more verification files of successful transmission of contents of the plurality of transactional database records associated with the first network to the second network.

2. A computer-implemented method of claim 1, wherein the one or more barcode scanning devices in communication with the second computer are configured to scan a plurality of barcodes simultaneously, and wherein the one or more barcode scanning devices in communication with the first computer are configured to scan a plurality of barcodes simultaneously.

3. A computer-implemented method of claim 2, wherein the plurality of transactional database records are associated with one or more data historians.

4. A computer-implemented method of claim 1, wherein the method further comprises:
   generating the one or more data barcodes on the display of the first computer;
   transferring decoded contents of the plurality of transactional database records to temporary storage associated with the second network after decoding the one or more data barcodes;
   generating the one or more validation barcodes on the display of the second computer;
   transferring decoded contents of the one or more validation files to temporary storage associated with the first network after decoding the one or more validation barcodes to thereby transfer decoded contents of the plurality of transactional database records to the first network for comparison to contents of the plurality of transactional database records;
   generating the one or more verification barcodes on the display of the first computer, responsive to a comparison of the securely communicated decoded contents of the plurality of transactional database records and contents of the plurality of transactional database records positioned in the first network; and
   discarding decoded contents of the plurality of transactional database records in temporary storage associated with the second network, responsive to an indication from decoded contents of the one or more verification files of unsuccessful transmission of contents of the plurality of transactional database records to the second network.

5. A computer-implemented method of claim 1, wherein the first network is a high-security network and the second network is a low-security network.

6. A computer-implemented method of claim 1, wherein the first network is a low-security network and the second network is a high-security network.

7. A computer-implemented method of claim 1, wherein decoding the one or more data barcodes includes disregarding error-correction capabilities of the one or more data barcodes; wherein the one or more data barcodes, the one or more validation barcodes, and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

8. A system to transfer data between two or more networks configured to have different levels of network protection, the system comprising:
   a first computer in communication with and positioned within a first network, the first computer including:
      one or more processors,
      one or more barcode scanning devices in communication with the one or more processors,
      one or more displays in communication with the one or more processors, and
      non-transitory memory medium in communication with the one or more processors, the memory medium including computer-readable instructions stored therein that when executed cause the first computer to perform the step of:
         decoding a first set of one or more barcodes indicative of contents of one or more validation files to thereby define one or more validation barcodes, responsive to receipt of a scan of one or more of one or more displays of a second computer by use of the one or more barcode scanning devices of the first computer, to produce contents of the one or more validation files represented by the one or more validation barcodes, the one or more validation barcodes configured to encode contents of the one or more validation files; and the second computer, the second computer positioned remote from the first computer and in communication with and positioned within a second network, the second network configured to have temporary storage and separate more permanent storage associated therewith, the second network further configured to have a different level of network security protection than the first network and to allow only one-way secure communication from the second network to the first network, the second computer including:

one or more processors, one or more input and output units in communication with the one or more processors of the second computer, one or more displays in communication the one or more processors of the second computer, another different one or more barcode scanning devices in communication with the one or more processors of the second computer, and non-transitory memory medium in communication with the one or more processors of the second computer, the memory medium including computer-readable instructions stored therein that when executed cause the second computer to perform the steps of:

decoding a second set of a different one or more barcodes indicative of contents of a plurality of transactional database records associated with and positioned within the first network to thereby define one or more data barcodes, responsive to receipt of a scan of one or more of the one or more displays of the first computer by use of the one or more barcode scanning devices of the second computer, to produce contents of the plurality of transactional database records represented by the one or more data barcodes, generating the one or more validation barcodes on one or more of the one or more displays of the second computer, the one or more validation files configured to include decoded contents of the plurality of transactional database records, to thereby securely communicate decoded contents of the plurality of transactional database records in one-way communication from the temporary storage associated with the second network to the first network for comparison to contents of the plurality of transactional database records associated with the first network, decoding a third set of one or more different barcodes indicative of contents of one or more verification files to thereby define one or more verification barcodes, responsive to receipt of a scan of one or more of the one or more displays of the first computer, by use of the one or more barcode scanning devices of the second computer, the one or more verification barcodes configured to encode contents of the one or more verification files, the one or more verification files configured to indicate success of transmission of contents of the plurality of transactional database records from the first network to the second network, and storing decoded contents of the plurality of transactional database records in the more permanent storage associated with the second network responsive to an indication from decoded contents of the one or more verification files of successful transmission of contents of the plurality of transactional database records associated with the first network to the second network.

9. A system of claim 8, wherein the one or more barcode scanning devices of the second computer are configured to scan a plurality of barcodes simultaneously, and wherein the one or more barcode scanning devices of the first computer are configured to scan a plurality of barcodes simultaneously.

10. A system of claim 9, wherein the plurality of transactional database records are associated with one or more data historians.

11. A system of claim 8, wherein the wherein the memory medium of the first computer further includes computer-readable instructions stored therein that when executed cause the first computer to perform the steps of:

generating the one or more data barcodes on one or more of the one or more displays of the first computer, transferring decoded contents of the one or more validation files to temporary storage associated with the first network after decoding the one or more validation barcodes to thereby transfer decoded contents of the plurality of transactional database records to the first network for comparison to contents of the plurality of transactional database records, and generating the one or more verification barcodes on one or more of the one or more displays of the first computer, responsive to a comparison of the securely communicated decoded contents of the plurality of transactional database records and contents of the plurality of transactional database records positioned in the first network; and wherein the memory medium of the second computer further includes computer-readable instructions stored therein that when executed cause the second computer to perform the steps of:

transferring decoded contents of the plurality of transactional database records to temporary storage associated with the second network after decoding the one or more data barcodes, generating the one or more validation barcodes on one or more of the one or more displays of the second computer, and discarding decoded contents of the plurality of transactional database records in temporary storage associated with the second network, responsive to an indication from decoded contents of the one or more verification files of unsuccessful transmission of contents of the plurality of transactional database records to the second network.

12. A system of claim 8, wherein the first network is a high-security network and the second network is a low-security network.

13. A system of claim 8, wherein the first network is a low-security network and the second network is a high-security network.

14. A system of claim 8, wherein decoding the one or more data barcodes includes disregarding error-correction capabilities of the one or more data barcodes; wherein the one or more data barcodes, the one or more validation barcodes, and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

15. Non-transitory computer-readable medium having one or more computer programs stored therein operable by one or more processors to transfer data between two or more networks configured to have different levels of network protection, the one or more computer programs comprising a set of instructions that, when executed by the one or more processors, cause the one or more processors to perform the operations of:

decoding a first set of one or more barcodes indicative of contents of a plurality of transactional database records associated with and positioned within a first network to thereby define one or more data barcodes, responsive to receipt of a scan of a display of a first computer in communication with and positioned within the first network, by use of one or more barcode scanning devices in communication with a second computer positioned remote from the first computer and in communication with and positioned within a second network, to produce contents of the plurality of transactional database records represented by the one or more data barcodes, the second network configured to have a different level of network security protection than the first network and to allow only one-way secure communication from the second network to the first network;

decoding a second set of one or more different barcodes indicative of contents of one or more validation files to thereby define one or more validation barcodes, responsive to receipt of a scan of a display of the second computer, by use of a different one or more barcode scanning devices in communication with the first computer, to produce contents of the one or more validation files represented by the one or more validation barcodes, the one or more validation barcodes configured to encode contents of the one or more validation files, the one or more validation files configured to include decoded contents of the plurality of transactional database records, to thereby securely communicate decoded contents of the plurality of transactional database records in one-way communication from temporary storage associated with the second network to the first network for comparison to contents of the plurality of transactional database records associated with the first network;

decoding a third set of one or more different barcodes indicative of contents of one or more verification files to thereby define one or more verification barcodes, responsive to receipt of a scan of the display of the first computer by use of the one or more barcode scanning devices in communication with the second computer, to produce contents of the one or more verification files represented by the one or more verification barcodes, the one or more verification barcodes configured to encode contents of the one or more verification files, the one or more verification files configured to indicate success of transmission of contents of the plurality of transactional database records from the first network to the second network; and storing decoded contents of the plurality of transactional database records in more permanent storage associated with the second network responsive to an indication from decoded contents of the one or more verification files of successful transmission of contents of the plurality of transactional database records associated with the first network to the second network.

16. Non-transitory computer-readable medium having one or more computer programs stored therein of claim 15, wherein the one or more barcode scanning devices in communication with the second computer are configured to scan a plurality of barcodes simultaneously, and wherein the one or more barcode scanning devices in communication with the first computer are configured to scan a plurality of barcodes simultaneously.

17. Non-transitory computer-readable medium having one or more computer programs stored therein of claim 16, wherein the plurality of transactional database records are associated with one or more data historians.

18. Non-transitory computer-readable medium having one or more computer programs stored therein of claim 15, wherein the set of instructions, when executed by the one or more processors, further cause the one or more processors to perform the operations of:

generating the one or more data barcodes on the display of the first computer;

transferring decoded contents of the plurality of transactional database records to temporary storage associated with the second network after decoding the one or more data barcodes;

generating the one or more validation barcodes on the display of the second computer;

transferring decoded contents of the one or more validation files to temporary storage associated with the first network after decoding the one or more validation barcodes to thereby transfer decoded contents of the plurality of transactional database records to the first network for comparison to contents of the plurality of transactional database records;

generating the one or more verification barcodes on the display of the first computer, responsive to a comparison of the securely communicated decoded contents of the plurality of transactional database records and contents of the plurality of transactional database records positioned in the first network; and discarding decoded contents of the plurality of transactional database records in temporary storage associated with the second network, responsive to an indication from decoded contents of the one or more verification files of unsuccessful transmission of contents of the plurality of transactional database records to the second network.

19. Non-transitory computer-readable medium having one or more computer programs stored therein of claim 15, wherein the first network is a high-security network and the second network is a low-security network.

20. Non-transitory computer-readable medium having one or more computer programs stored therein of claim 15, wherein the first network is a low-security network and the second network is a high-security network.

21. Non-transitory computer-readable medium having one or more computer programs stored therein of claim 15, wherein decoding the one or more data barcodes includes disregarding error-correction capabilities of the one or more data barcodes; wherein the one or more data barcodes, the one or more validation barcodes, and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

* * * * *